United States Patent [19]

Iwasaki et al.

[11] Patent Number: 6,158,836
[45] Date of Patent: Dec. 12, 2000

[54] PRINT METHOD AND APPARATUS

[75] Inventors: Osamu Iwasaki, Tokyo; Naoji Ohtsuka, Yokohama; Kiichiro Takahashi; Hitoshi Nishikori, both of Kawasaki, all of Japan

[73] Assignee: Canon Kabushiki Kaisha, Tokyo, Japan

[21] Appl. No.: 08/847,984

[22] Filed: Apr. 22, 1997

[30] Foreign Application Priority Data

Apr. 23, 1996 [JP] Japan ................................ 8-101714

[51] Int. Cl.⁷ .................... B41J 2/205; B41J 29/38; B41J 2/21; H04N 1/40
[52] U.S. Cl. .................... 347/15; 347/43; 347/14; 358/455; 358/456; 358/1.9
[58] Field of Search ................ 347/15, 43, 14; 358/455, 456; 395/109, 117

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,516,135 | 5/1985 | Todoh | 347/184 |
| 4,528,576 | 7/1985 | Koumura et al. | 347/65 |
| 4,558,333 | 12/1985 | Sugitani et al. | 347/65 |
| 4,560,997 | 12/1985 | Sato et al. | 347/15 |
| 4,608,577 | 8/1986 | Hori | 347/66 |
| 4,617,580 | 10/1986 | Miyakawa et al. | 347/15 |
| 4,630,076 | 12/1986 | Yoshimura | 347/43 |
| 4,635,078 | 1/1987 | Sakurada et al. | 347/15 |
| 4,723,129 | 2/1988 | Endo et al. | 347/56 |
| 4,740,796 | 4/1988 | Endo et al. | 347/56 |
| 4,860,026 | 8/1989 | Matsumoto et al. | 347/15 |
| 4,872,027 | 10/1989 | Buskirk et al. | 347/19 |
| 5,049,898 | 9/1991 | Arthur et al. | 347/19 |
| 5,097,343 | 3/1992 | Chiba et al. | 358/296 |
| 5,138,344 | 8/1992 | Ujita | 347/86 |
| 5,142,374 | 8/1992 | Tajika et al. | 358/298 |
| 5,235,351 | 8/1993 | Koizumi | 347/14 |
| 5,245,362 | 9/1993 | Iwata et al. | 347/23 |
| 5,394,250 | 2/1995 | Shono | 358/455 |
| 5,448,274 | 9/1995 | Hirabayashi et al. | 347/86 |
| 5,579,446 | 11/1996 | Naik et al. | 358/1.4 |
| 5,604,520 | 2/1997 | Matsubara et al. | 347/43 |
| 5,623,294 | 4/1997 | Takizawa et al. | 347/98 |
| 5,625,384 | 4/1997 | Numata et al. | 347/23 |
| 5,625,397 | 4/1997 | Allred et al. | 347/100 |
| 5,714,990 | 2/1998 | Courtney | 347/14 |
| 5,729,259 | 3/1998 | Gotoh et al. | 347/43 |
| 5,739,828 | 4/1998 | Moriyama et al. | 347/9 |
| 5,742,306 | 4/1998 | Gompertz et al. | 347/43 |
| 5,805,180 | 9/1998 | Ebisawa et al. | 347/23 |
| 5,818,474 | 10/1998 | Takahashi et al. | 347/15 |
| 5,828,389 | 10/1998 | Yamaguchi et al. | 347/23 |
| 5,831,646 | 11/1998 | Kuronuma et al. | 347/30 |
| 5,854,642 | 12/1998 | Takahashi et al. | 347/40 |

FOREIGN PATENT DOCUMENTS

| | | |
|---|---|---|
| 0 351 754 | 1/1990 | European Pat. Off. . |
| 0 372 826 | 6/1990 | European Pat. Off. . |
| 0 401 023 | 12/1990 | European Pat. Off. . |
| 0 440 261 | 8/1991 | European Pat. Off. . |
| 0 585 028 | 3/1994 | European Pat. Off. . |
| 0 595 517 | 5/1994 | European Pat. Off. . |

(List continued on next page.)

*Primary Examiner*—Thinh Nguyen
*Attorney, Agent, or Firm*—Fitzpatrick, Cella, Harper & Scinto

[57] ABSTRACT

Multi-valued image data is separated into data in units of nozzle groups of the individual colors of a printhead, and each divided multi-valued image data is converted into n-valued image data consisting of a plurality of bits. Based on the n-valued image data of the corresponding colors, print codes are generated and are transmitted to a printer apparatus. The printer apparatus receives the print codes, stores them in print buffers of the corresponding colors, and generates print data based on the print codes using mask patterns set in correspondence with image data of the individual colors. The print timing in each scan of the printhead is determined in accordance with the significant bit position in the print data, and an image is printed on the basis of the print data by multi-pass printing.

16 Claims, 24 Drawing Sheets

FOREIGN PATENT DOCUMENTS

| | | |
|---|---|---|
| 0 600 735 | 6/1994 | European Pat. Off. . |
| 0 627 323 | 12/1994 | European Pat. Off. . |
| 0 628 415 | 12/1994 | European Pat. Off. . |
| 0 630 752 | 12/1994 | European Pat. Off. . |
| 0 642 260 | 3/1995 | European Pat. Off. . |
| 0 654 352 | 5/1995 | European Pat. Off. . |
| 0 687 565 | 12/1995 | European Pat. Off. . |
| 0 688 673 | 12/1995 | European Pat. Off. . |
| 0 700 786 | 3/1996 | European Pat. Off. . |
| 0 720 916 | 7/1996 | European Pat. Off. . |
| 0 741 488 | 11/1996 | European Pat. Off. . |
| 0 750 994 | 1/1997 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 60-163571 | 8/1985 | Japan . |
| 62-161541 | 7/1987 | Japan . |
| 2-031562 | 2/1990 | Japan . |
| 3-005156 | 1/1991 | Japan . |
| 3-051138 | 3/1991 | Japan . |
| 6-155758 | 6/1994 | Japan . |
| 6-199031 | 7/1994 | Japan . |
| 7052390 | 2/1995 | Japan . |
| 7144419 | 6/1995 | Japan . |

00

01

10

11

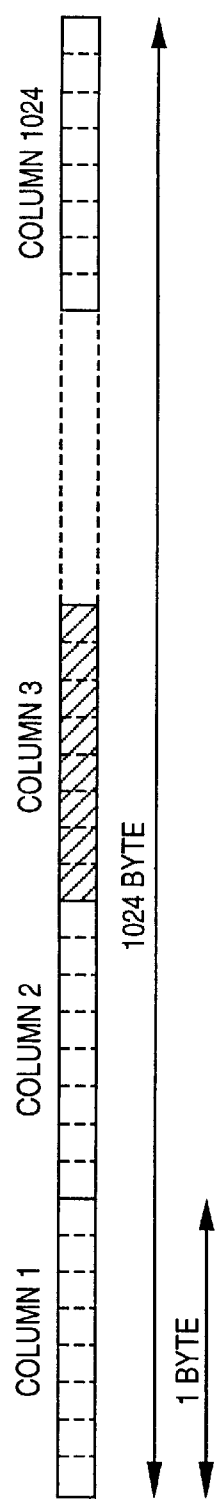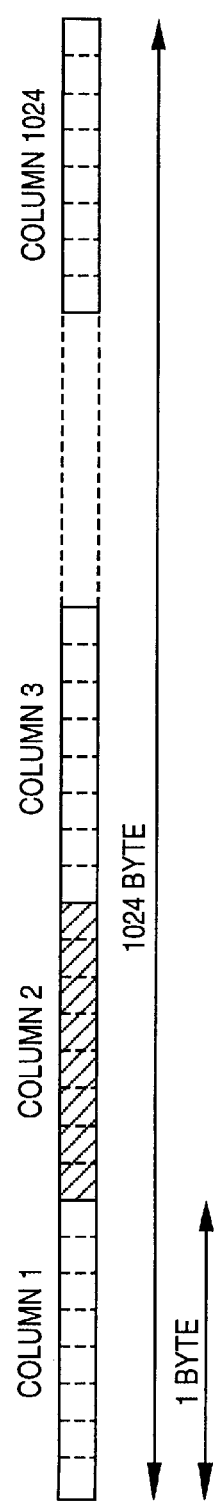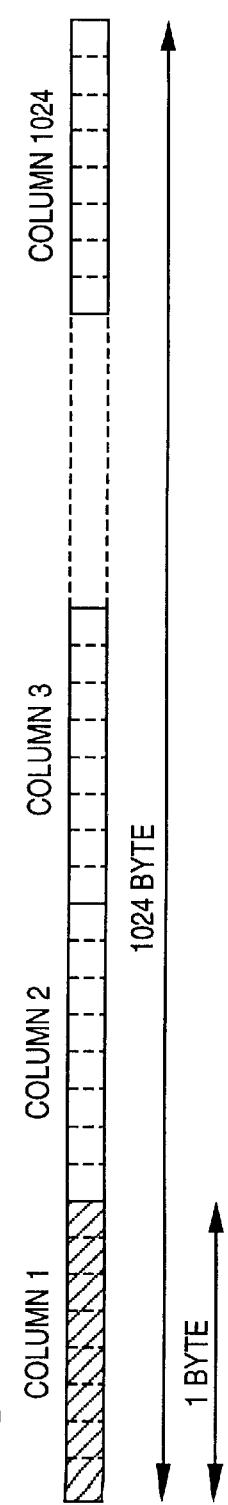

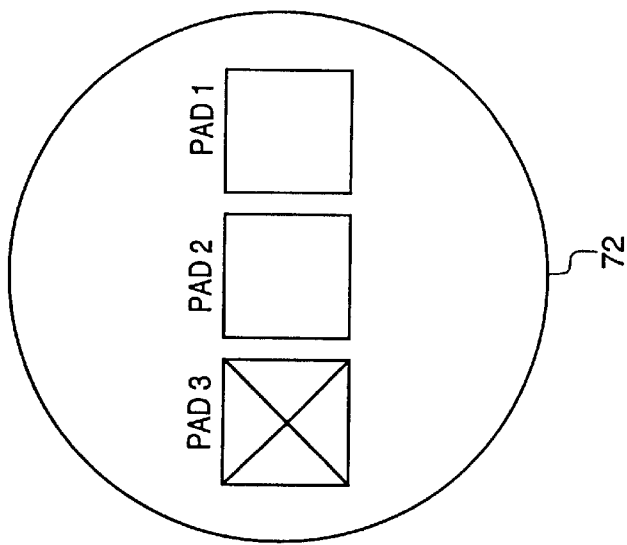
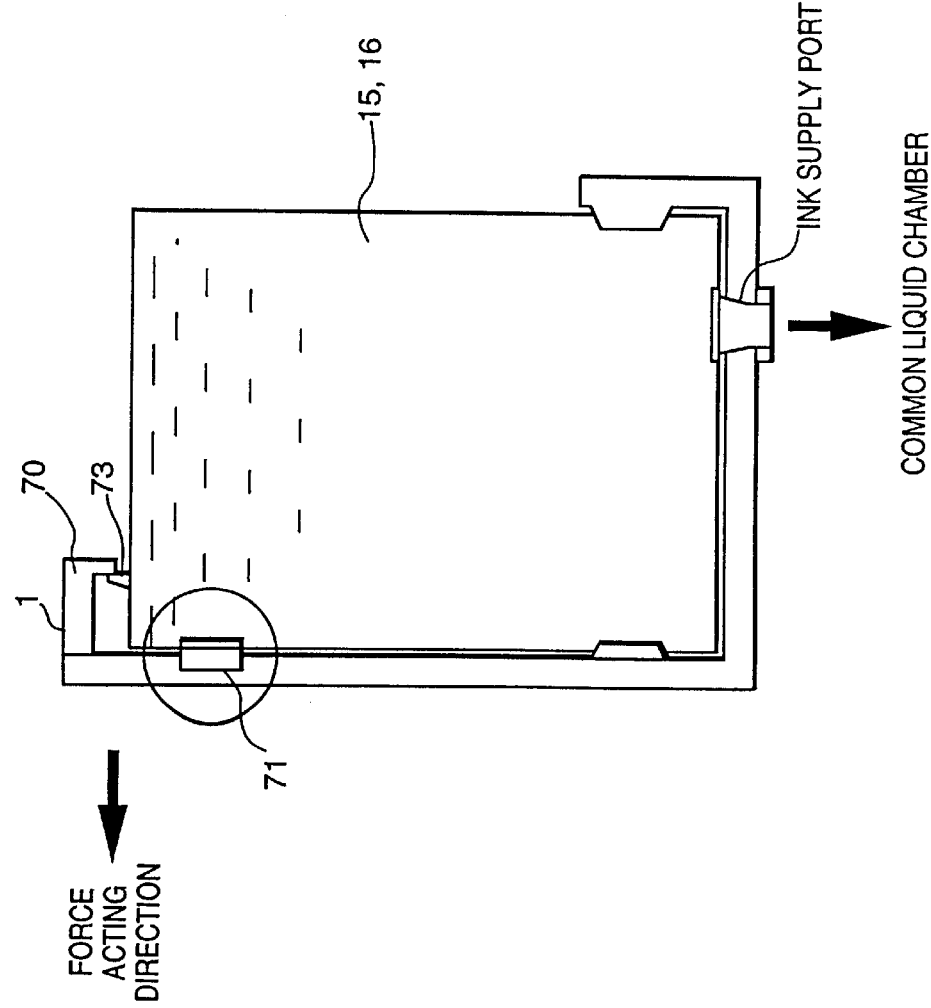

FIG. 23

```
PRINT MODE
         O   NORMAL MODE
         O   PICTORIAL MODE 1
         O   PICTORIAL MODE 2
         O   MONOCHROME MODE
```

FIG. 24

```
SET PLAIN PAPER, COATED PAPER,
     OR PICTORIAL PAPER
```

FIG. 25

```
MOUNT HEAD CARTRIDGE FOR PICTORIAL MODE 1

CURRENT HEAD CARTRIDGE    | FOR NORMAL MODE |
```

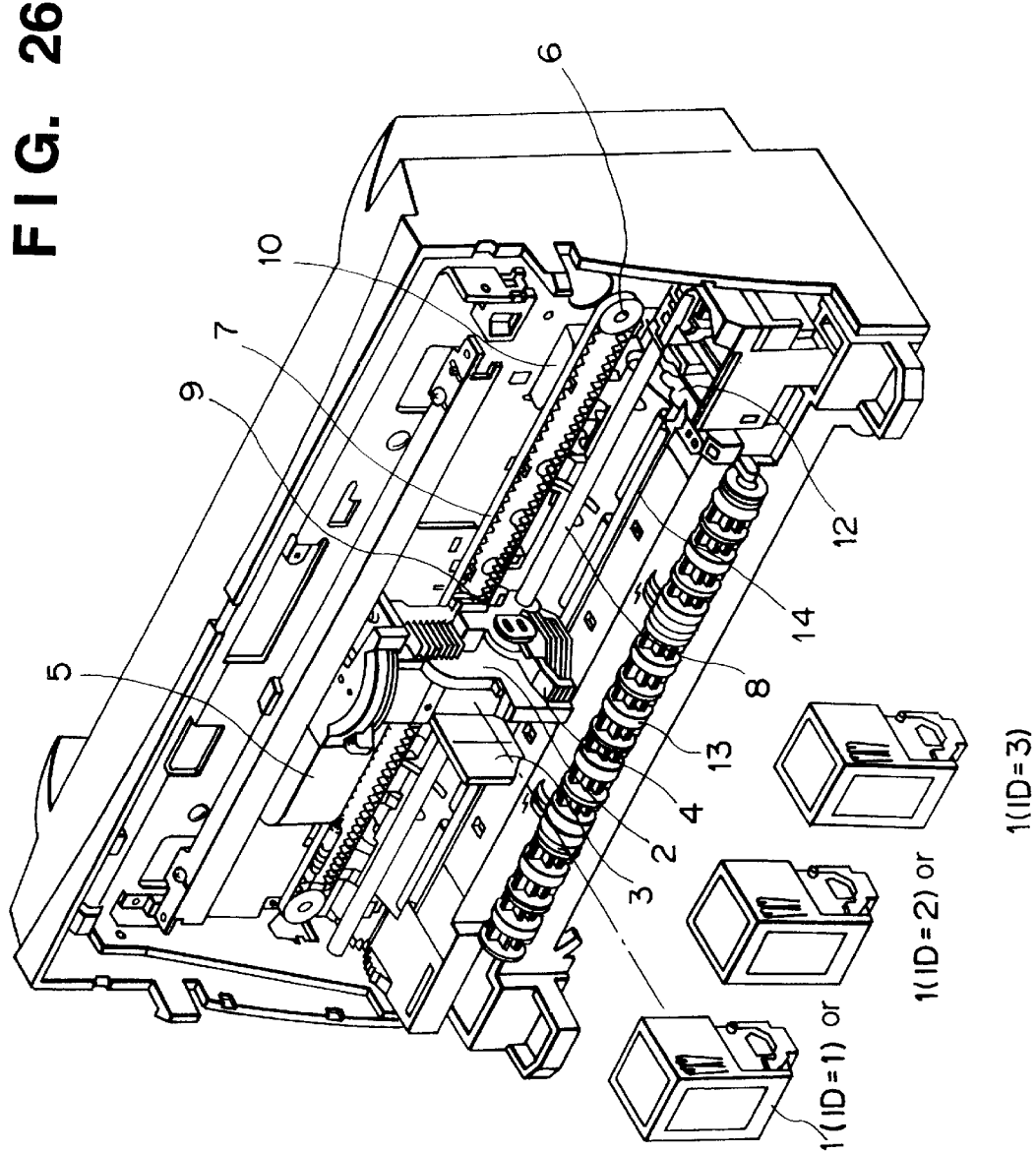

PRINT METHOD AND APPARATUS

CROSS-REFERENCE TO RELATED APPLICATIONS

This application is related, to U.S. pat. applications Ser.No. 08/844,854, No. 08/847,740, No. 08/847,743 and No. 08/847,744, all filed on Apr. 22, 1997.

BACKGROUND OF THE INVENTION

The present invention relates to a print method and apparatus for printing an image on a printing medium using a print means.

In recent years, color printers using various print schemes have been developed as color image print equipment. Of these printers, serial ink-jet printers that print in units of lines (bands) are popularly used owing to their merits, i.e., since they are inexpensive, can print high-quality images on a large number of kinds of print media, can be easily made compact, and so on.

Such serial printer forms a print image by developing print information for one scan into image data to store the data in a memory, and driving the print elements of a printhead on the basis of the developed image data while scanning the printhead with respect to a printing medium. Among such serial printer apparatuses, a color printer apparatus that prints a color image using color inks is known, and as its printhead, a head prepared by vertically arranging print element groups for printing yellow, magenta, cyan, and black image data in a direction perpendicular to the scanning direction of the printhead is popularly used. In the printhead with this arrangement, the print element groups corresponding to the individual colors are arranged to be separated by given intervals to produce a delay time from when the print scan using one color print element group is complete for the printing medium until the print scan of print data of the next color is started, thereby eliminating color smearing. Also, a decrease in print speed caused by the delay time is prevented. In this manner, color nonuniformity, smearing, and the like, which are produced between adjacent different color dots on the printing medium, can be eliminated, and a color output with high image quality can be realized.

In recent years, many printer apparatuses perform binarization processing for image data including multi-valued information per pixel like a picture image and output the processed data. When such multi-valued data is converted into binary data, the size (dot area) of one pixel printed and its lightness determine the graininess of the image. More specifically, it is generally known that the graininess increases as the area (dot shape) of one pixel printed is larger, and as the lightness of the pixel is lower (its density is higher). As a technique for reducing the graininess in a printed image, a technique for reducing the area of each pixel (dot) to be printed to increase the resolution of the printed image has been proposed.

In order to increase the resolution of print data in the conventional color printer apparatus, the storage capacity of a memory means (print buffer) for storing image data must also be increased. For example, when one pixel is printed as 4-gradation data, the pixel data requires 3 bits. More specifically, a storage capacity three times that for 1-bit pixel data is required. Normally, the print buffer comprises a RAM (random access memory). Since the cost of such RAM is roughly determined in proportion to its memory capacity, an increase in storage capacity of the memory raises the cost of the apparatus.

SUMMARY OF THE INVENTION

The present invention has been made in consideration of the above-mentioned prior art, and has as its object to provide a print method and apparatus, which can print multi-valued image data while reducing the capacity of a print buffer.

It is another object of the present invention to provide a print method and apparatus which can print an image while reducing graininess in the printed image.

It is still another object of the present invention to provide a print method and apparatus, which use a plurality of inks having at least different saturation and luminance levels, and print each pixel of image data by overstriking these inks in accordance with the image data so as to obtain linear print density characteristics corresponding to the density of the image data.

It is still another object of the present invention to provide a print method and apparatus which can obtain a printed image with good gradation characteristics corresponding to color image data.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIGS. 12A to 12C are views showing the formats of mask patterns used in the first embodiment;

FIGS. 20A and 20B are views for explaining the method of identifying the type of ink tank in the printer apparatus in still another embodiment of the present invention;

FIGS. 23 to 25 are views showing display examples on a screen when a print mode is to be manually set in the embodiment of the present invention; and FIG. 26 is a perspective view showing the outer appearance of printhead cartridges having different inks and a printer apparatus main body in still another embodiment of the present invention.

PREFERRED EMBODIMENTS OF THE PRESENT INVENTION

Prior to a description of the preferred embodiments of the present invention, its outline will be briefly explained. In this embodiment, multi-pass printing attained by a plurality of scans of a printhead and disclosed in Japanese Patent Laid-Open No. 07-052390 is realized by executing it on the basis of image data thinned out using a thin-out pattern. More specifically, in the data configuration of this thin-out pattern, the even and odd columns have different generation rates of "1".

For example, image data which is expressed by 2 bits per pixel is masked by the above-mentioned thin-out pattern, and when the upper bit of the 2 bits is "1", the pixel is printed by two scans. On the other hand, when the lower bit of the 2 bits is "1", the pixel is printed by one scan.

With this processing, for pixel data in binary notation, if one pixel data is "00", the pixel is not printed. If one pixel data is "01", the pixel is printed by one dot. On the other hand, if one pixel data is "10", the pixel is printed by two dots. If one pixel data is "11", the pixel is printed by three dots. In this manner, four gradation levels can be expressed by 2 bits.

The preferred embodiments of the present invention will be described in detail hereinafter with reference to the accompanying drawings.

A printer apparatus of this embodiment has C printheads (C is an integer equal to or larger than "2") corresponding to C print colors, and also has print buffers in correspondence with the printheads of the individual colors. Furthermore, in this embodiment, color image information which is expressed by N values (N is an integer equal to or larger than "3") per pixel is converted into n-valued print data per pixel (n is an integer that satisfies 2<n<N). In this embodiment, n-value conversion processing based on error diffusion is adopted, and this n-value conversion method will be described below with reference to FIG. 4.

Figure 4:
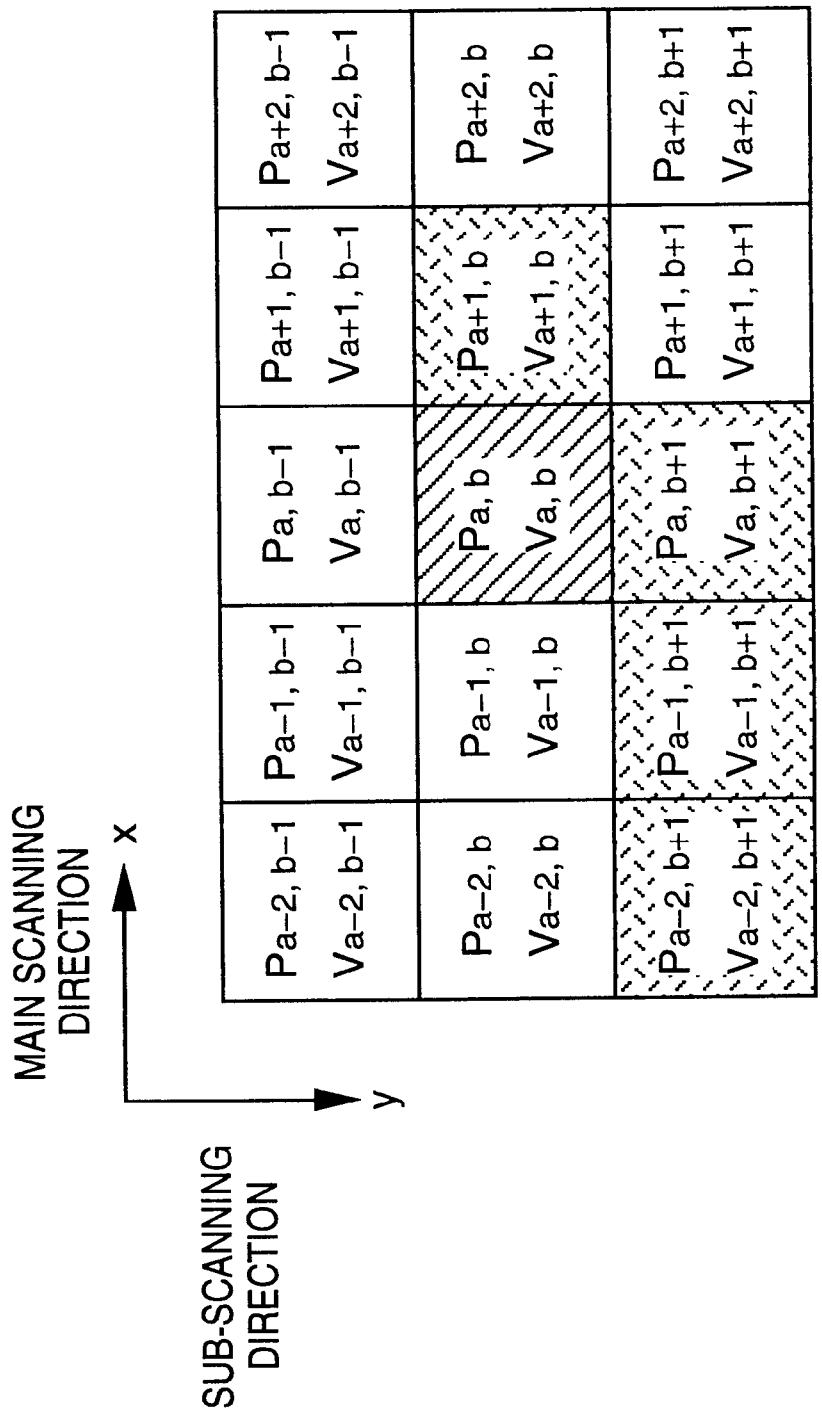
FIG. 4 is a view for explaining the error diffusion method used in the embodiments of the present invention.

As shown in FIG. 4, a parameter x represents the main-scanning direction in which printing is performed, a parameter y represents the sub-scanning direction, $P_{x,y}$ represents each pixel, and $V_{x,y}$ represents the pixel density of the pixel $P_{x,y}$. Assume that $p_{a,b}$ represents the pixel of interest, and pixels located within the range that satisfies y≦b and x<a have already been n-value-converted. In this case, each of (n−1) threshold values T for n-value-converting the pixel density $V_{a,b}$ of the pixel $P_{a,b}$ of interest is given by:

$$T=(2k-1)\times(N-1)/\{2\times(n-1)\}$$

(where k is an integer falling within the range from 1 to (n−1).)

Figure 5:
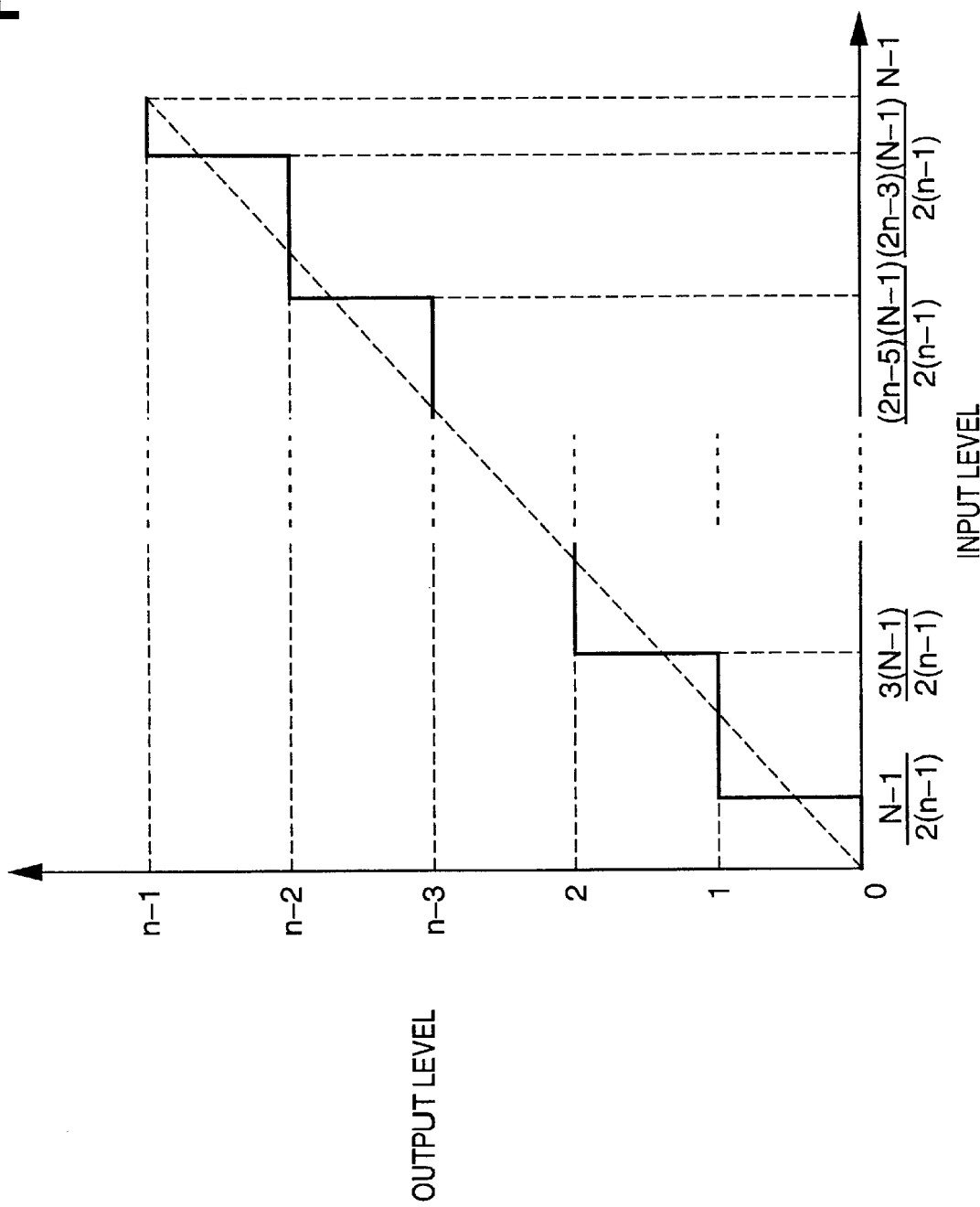
FIG. 5 is a graph for explaining n-value conversion of N-valued data by the error diffusion method of the embodiment of the present invention.

FIG. 5 shows the relationship between the input level expressed by N values, and the n-valued output level.

In this case, an error E produced between the input level value (pixel density) and the threshold value T is described by:

$$E=V_{a,b}-((2k-1)\times(N-1))/(2\times(n-1))$$

Subsequently, the error E is distributed to non-n-valued pixels $P_{a+1,b}$, $P_{a-2,b+1}$, $P_{a-1,b+1}$, and $P_{a,b+1}$ around the pixel $P_{a,b}$ of interest. In this case, processing operations based on the following equations are made using weighting coefficients W0, W1, W2, and W3 obtained by experience:

$$V_{a+1,b}=V_{a+1,b}+E\times W0$$

$$V_{a-2,b+1}=V_{a-2,b+1}+E\times W1$$

$$V_{a-1,b+1}=V_{a-1,b+1}+E\times W2$$

$$V_{a,b+1}=V_{a,b+1}+E\times W3$$

An example of these values of the weighting coefficients are as follows:

$$W0=7/16, W1=1/16, W2=5/16, W3=3/16$$

The n-value conversion processing is preferably executed by a host computer as an image processing apparatus.

Figure 6:
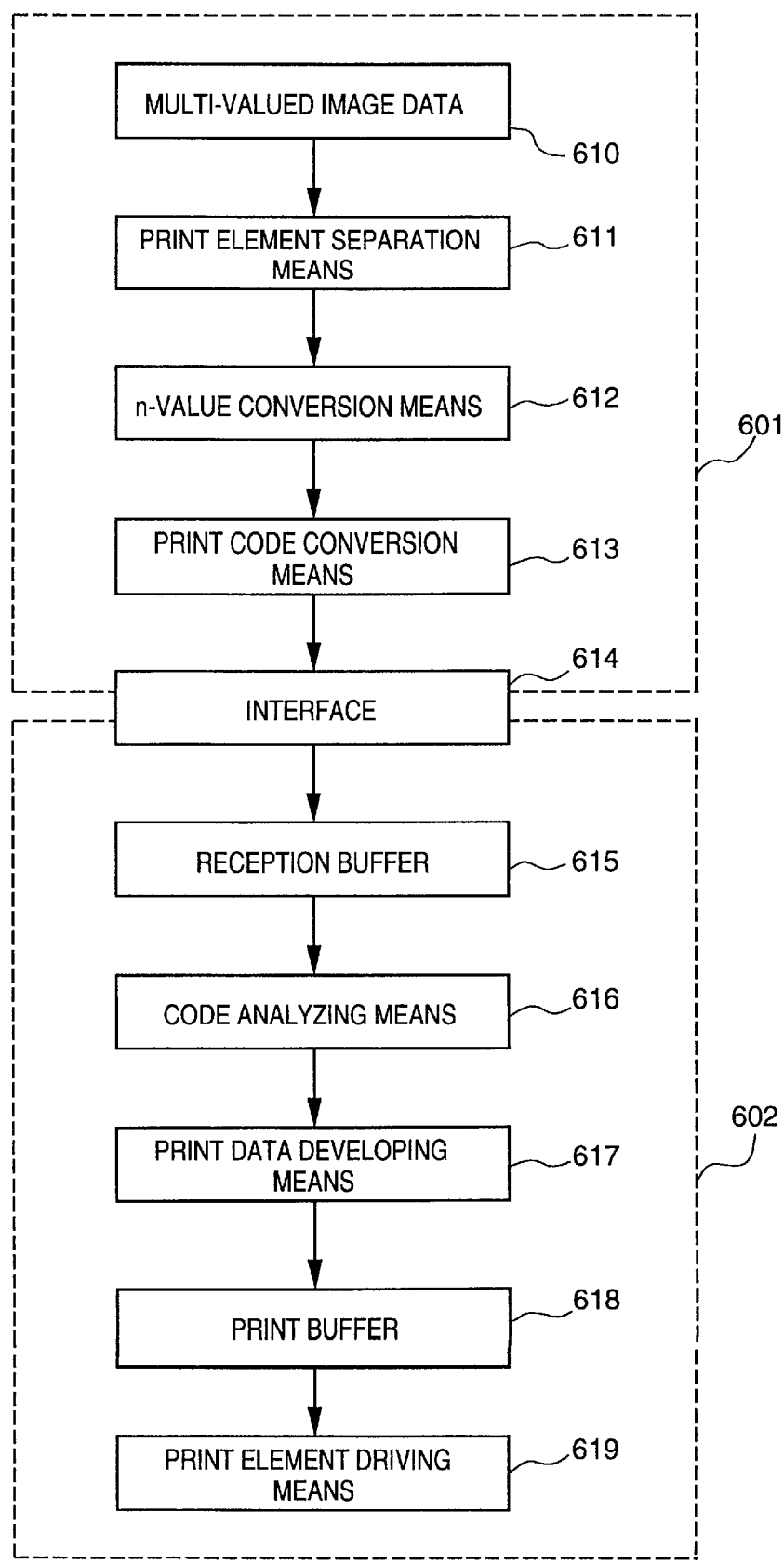
FIG. 6 is a functional block diagram of a print system used in the embodiments of the present invention.

FIG. 6 shows the flow of image information in a print system including such host computer 601 and a printer apparatus 602.

Referring to FIG. 6, a region 601 bounded by a dotted line indicates the processing in the host computer 601. In this processing, multi-valued image data 610 is separated into multi-valued data in units of print elements (e.g., print data corresponding to colors) by a printer element separation means 611. Then, the multi-valued data are subjected to n-value conversion in units of print elements of the individual colors using an n-value conversion means 612, i.e., converted into n-valued image information per pixel in units of print elements. The n-valued image information is converted by a print code conversion means 613 into print codes in the form of commands that can be recognized by the printer apparatus 602. The codes are transmitted to the printer apparatus 602 via an interface 614.

The printer apparatus 602 receives the codes transmitted via the interface 614, and stores them in a reception buffer 615. Then, the print codes stored in the reception buffer 615 are analyzed using a print code analyzing means 616. Image data is developed to images by a print data developing means 617 based on the analyzed data, and these images are developed on print buffers 618 in units of image data of the print elements. Based on the image data corresponding to the print elements developed on the print buffers 618, a color image is formed on a printing medium by driving the corresponding print elements.

The mechanical arrangement of the printer apparatus 602 of this embodiment will be described below with reference to FIG. 2.

Figure 2:
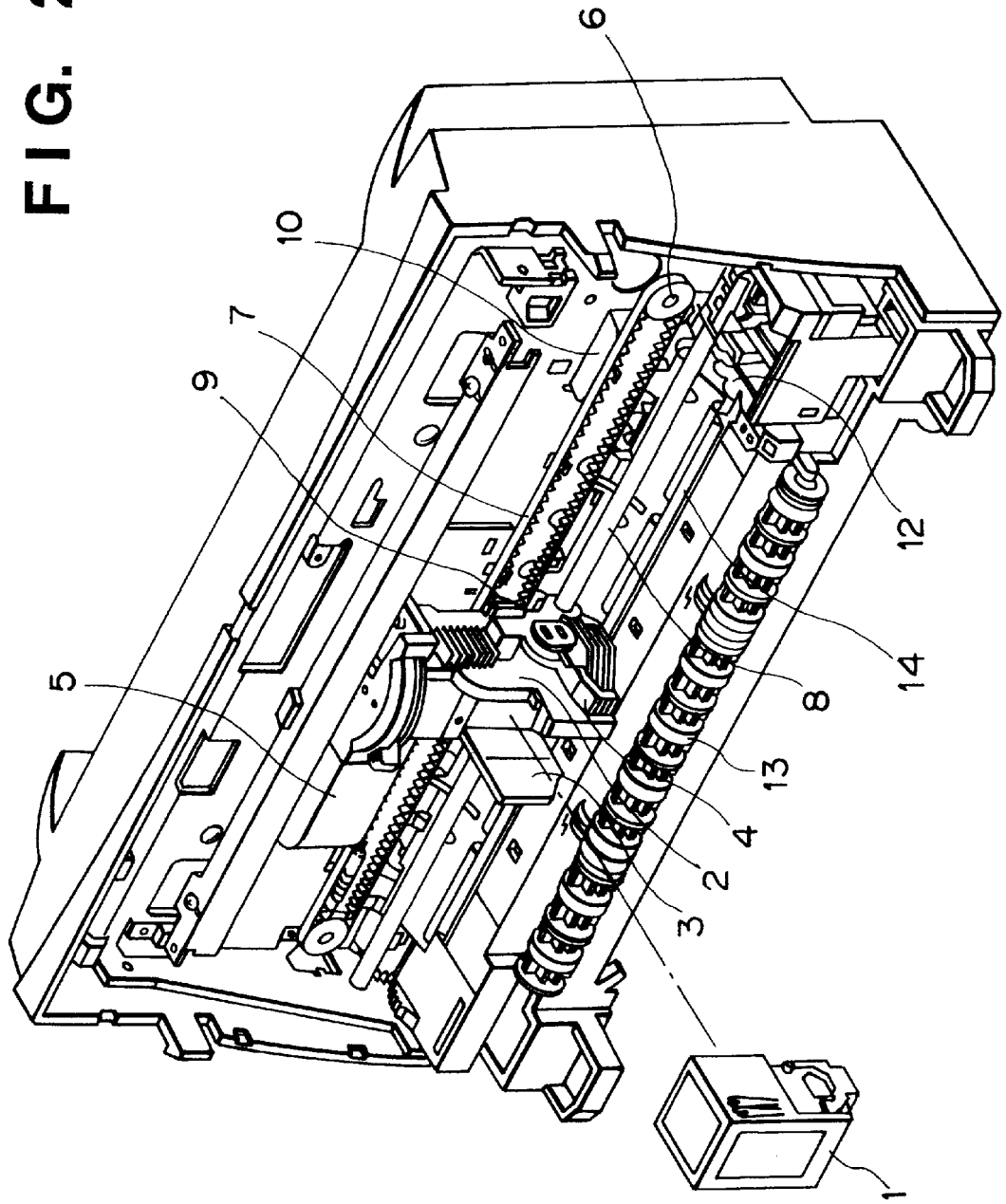
FIG. 2 is a perspective view showing the mechanical arrangement of a printer apparatus main body used in the embodiments of the present invention.

FIG. 2 is a perspective view showing the outer appearance of the mechanical arrangement of a cartridge exchangeable type serial color ink-jet printer apparatus according to the embodiment of the present invention, and illustrates a state wherein the front cover of the color ink-jet printer apparatus is detached to expose the interior of the apparatus.

Reference numeral 1 denotes an exchangeable ink cartridge. Reference numeral 2 denotes a carriage unit to which the ink cartridge 1 is attached and which is scanned in the right-and-left direction in FIG. 2. Reference numeral 3 denotes a holder for fixing the ink cartridge 1 to the carriage unit 2. The holder 3 cooperates with a cartridge fixing lever 4. When the cartridge fixing lever 4 is activated after the ink cartridge 1 is set in the carriage unit 2, the ink cartridge 1 is press-fitted in the carriage unit 2, thus attaining positioning of the ink cartridge 1 and obtaining electrical contacts. Reference numeral 5 denotes a flexible cable which transmits electrical signals from a control unit 101 (FIG. 14) or the like of the printer unit 602 to the carriage unit 2.

Reference numeral 6 denotes a carriage motor which reciprocally moves the carriage unit 2 in the main scanning direction by its rotation. Reference numeral 7 denotes a carriage belt, a portion of which is fixed to the carriage unit 2, and which is wound around a pulley that rotates upon rotation of the carriage motor 6, thus reciprocally moving the carriage unit 2. Reference numeral 8 denotes a guide shaft that slidably supports the carriage unit 2. Reference numeral 9 denotes a home position sensor which is attached to the carriage unit 2, and comprises, e.g., a photocoupler for determining the home position of the carriage unit 2. Reference numeral 10 denotes a light-shield plate, which shields light coming from the photocoupler in the home position sensor 9 and allows to detect the arrival of the carriage unit 2 at its home position when the carriage unit 2 has reached the home position. Reference numeral 12 denotes a home position unit which includes a recovery system for a printhead (included in the ink cartridge 1) mounted on the carriage unit 2. Reference numeral 13 denotes a discharge roller for discharging a printing medium outside the apparatus. The discharge roller 13 clamps a printing medium between itself and a spur unit (not shown) and discharges it outside the printer apparatus. Reference numeral 14 denotes an LF unit which includes a feed motor (to be described later) and feeds a printing medium by a predetermined amount in the sub-scanning direction.

Figure 3:
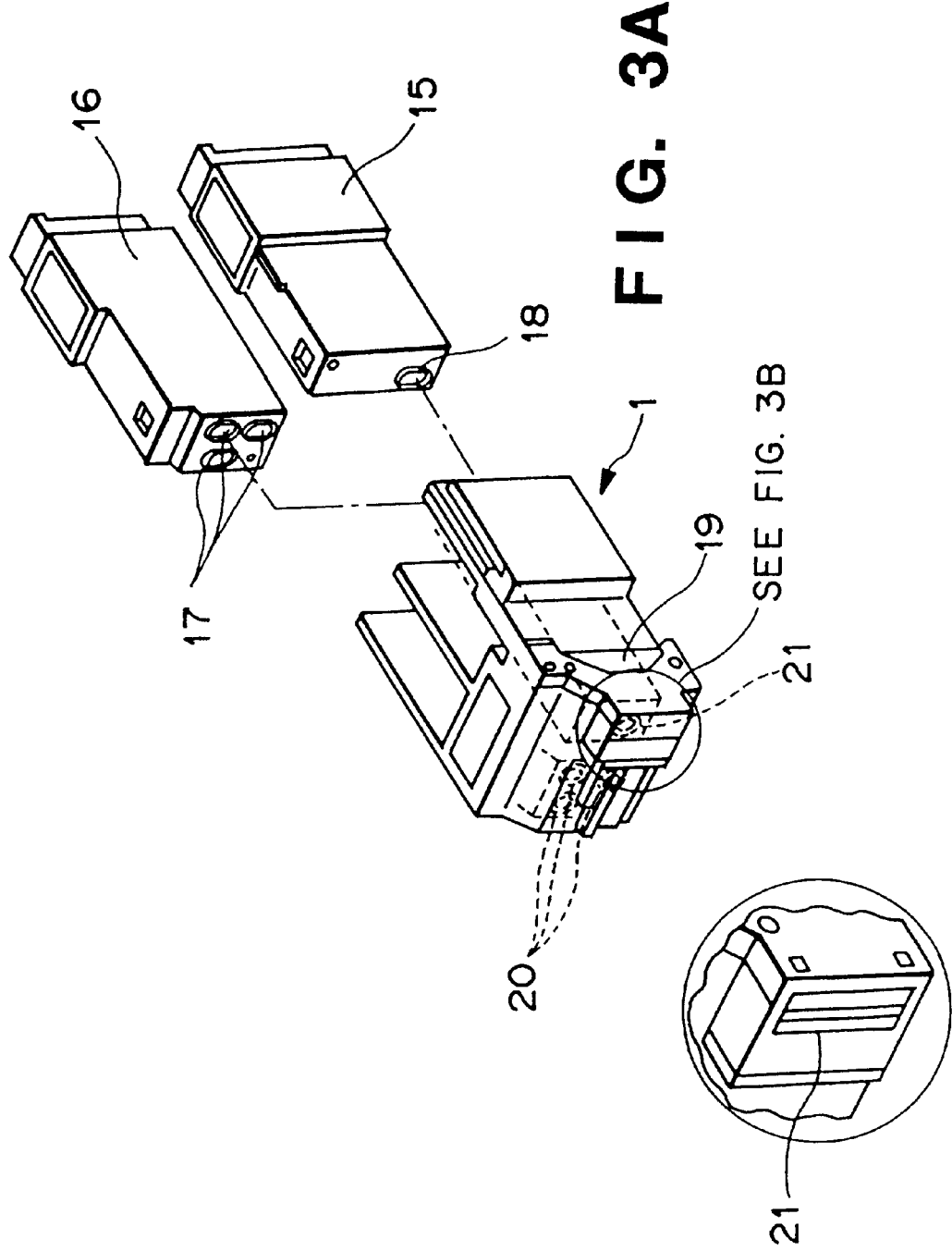
FIG. 3A is a perspective view showing the arrangement of a printhead used in the embodiments of the present invention.
FIG. 3B is an enlarged portion thereof.

FIG. 3A shows in detail the ink cartridge used in the embodiment of the present invention, and FIG. 3B is an enlarged portion thereof. This ink cartridge comprises ink tanks 15 and 16 that contain inks, and a printhead unit 21 which receives inks supplied from the ink tanks and performs printing by the ink-jet method.

Reference numeral 15 denotes an exchangeable ink tank that contains black ink. Reference numeral 16 denotes an exchangeable ink tank that contains cyan, magenta, and yellow inks. Reference numeral 17 denotes coupling ports (supply ports) between the ink tank 16 and the ink cartridge 1, which ports are coupled to supply tubes 20 of the ink cartridge 1 to supply inks into the ink cartridge 1. Reference numeral 18 denotes an ink supply port of the black ink tank 15. When the tanks 15 and 16 are mounted on the cartridge 1, these ink supply ports 17 and 18 are coupled to the supply tubes 20 so as to supply inks to the printhead unit 21. Reference numeral 19 denotes a contact portion for electrical signals, which is connected to the flexible cable 5 to supply signals from the control unit 101 (FIG. 14) and the like to the printhead unit 21.

The detailed embodiments of the present invention will be described hereinafter.

[First Embodiment]

Figure 7:
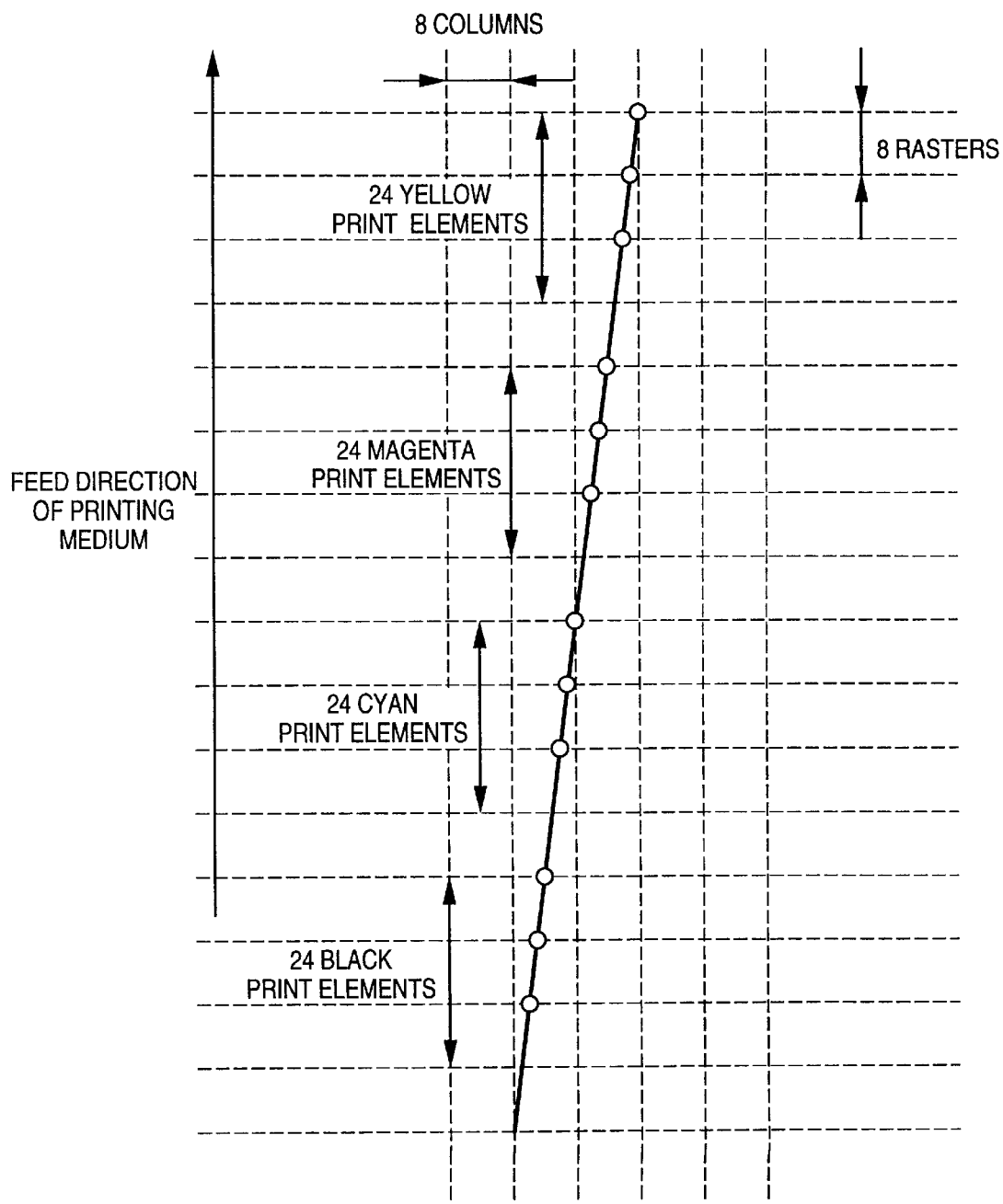
FIG. 7 is a view showing the layout of print elements of a printhead of a printer apparatus according to the first embodiment of the present invention.

FIG. 7 shows the layout of print elements (nozzles) in a printhead of a color ink-jet printer apparatus of this embodiment and positional relationship between the print elements and a printing medium (print paper sheet).

As shown in FIG. 7, the print element groups of the printhead are arranged in the feed direction of the printing medium, and 24 elements each are arranged in the order of black, cyan, magenta, and yellow from the upstream side in the feed direction. The interval between adjacent print element groups corresponding to the colors is assumed to be 8 elements. Also, the print width printed by one scan of the printhead in the main scanning direction is assumed to be 8 inches. As shown in FIG. 7, the positional relationship between the printing medium and the print elements has a slope of one column (dots) with respect to eight rasters.

In the color ink-jet printer apparatus of this embodiment, black, cyan, magenta, and yellow inks are diluted to have a dye or pigment concentration ⅓ that of normal ink. This is because the optical reflection density obtained upon overstriking two or three dots on an area filled with printed dots (solid state) using such diluted inks has better gradation characteristics than those obtained when normal inks are used.

Figure 8:
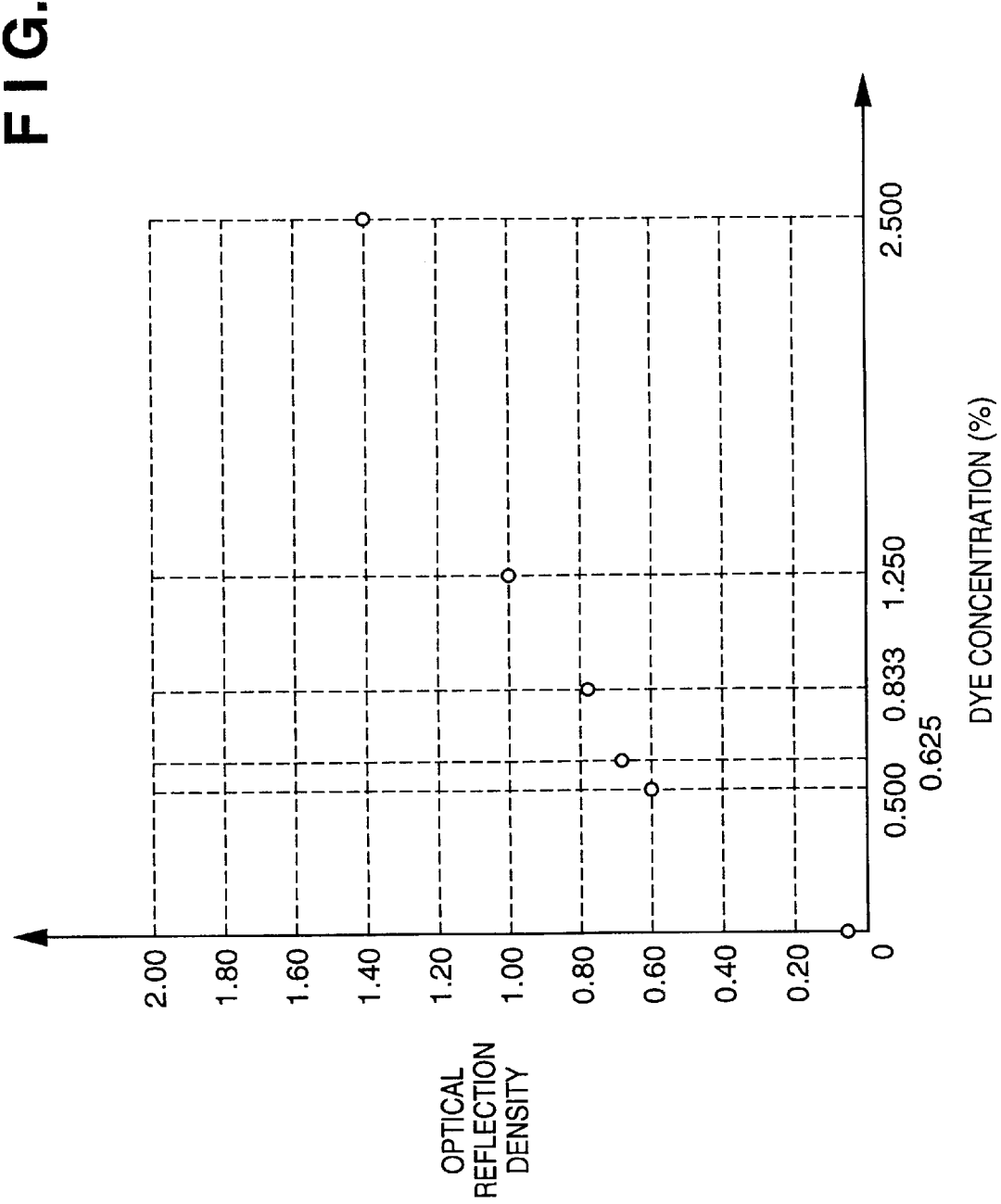
FIG. 8 is a graph showing the relationship between the dye concentration and optical reflection density (print density) of ink used in the printer apparatus of the first embodiment.

FIG. 8 shows the relationship between the dye concentration (%) of ink and the optical reflection density of a dot printed using the ink.

Figure 9:
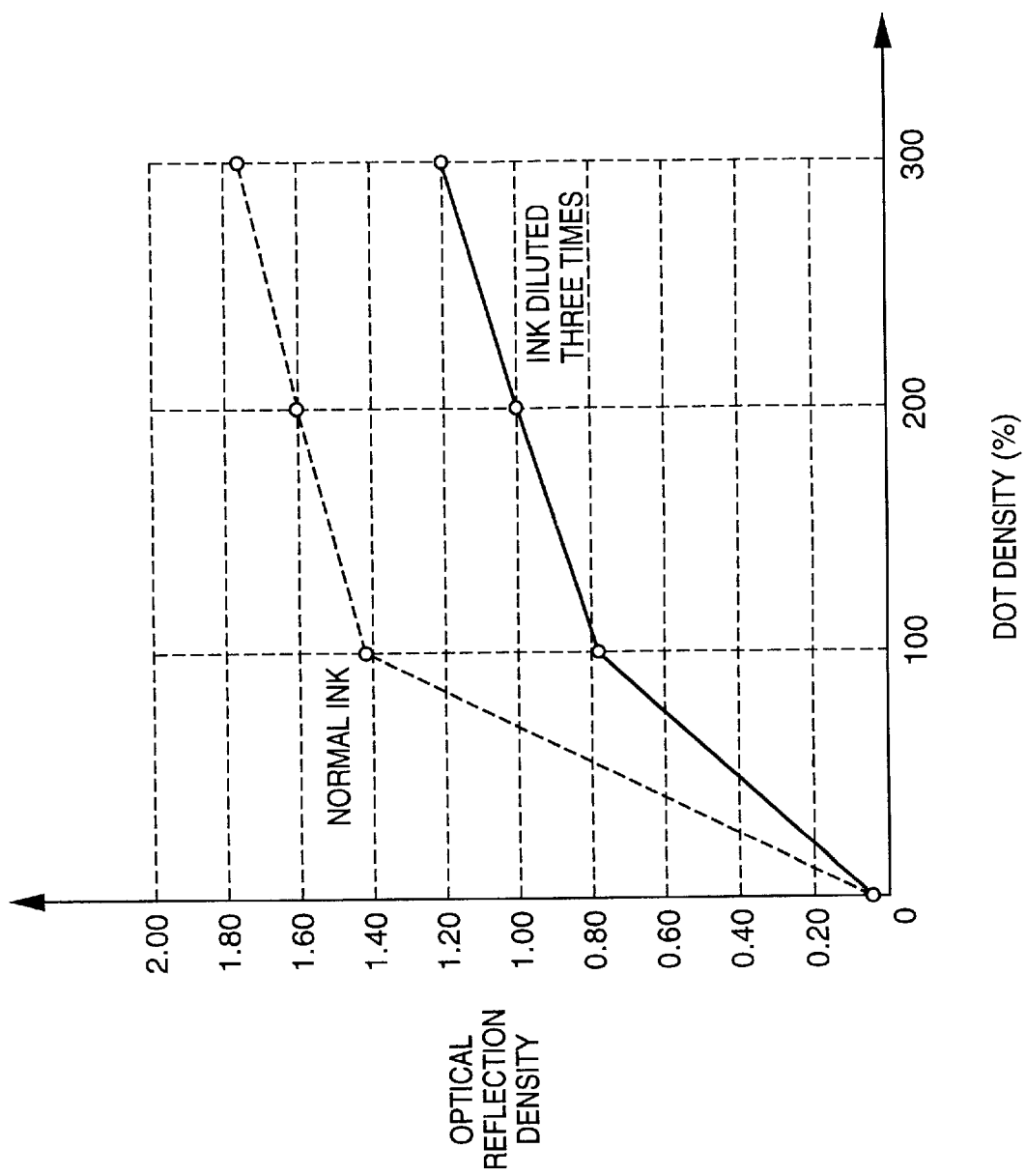
FIG. 9 is a graph showing the relationship between the pixel density and optical reflection density (print density) printed using ink with normal concentration and ink diluted three times.

FIG. 9 shows the relationship between the dot density (%) and the optical reflection density of the dot, and FIGS. 10A to 10D show the relationship between the pixel data and the dots to be printed based on the data. In FIGS. 10A to 10D, the frames bounded by the dotted lines correspond to the print density of the dots to be printed at a resolution of, e.g., 360 dpi.

Figure 10A:
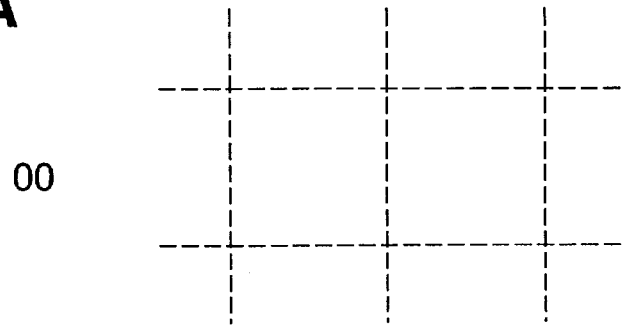
FIGS. 10A to 10D are views showing the relationship between the 2-bit print data and dots printed in accordance with the print data.
Figure 10B:
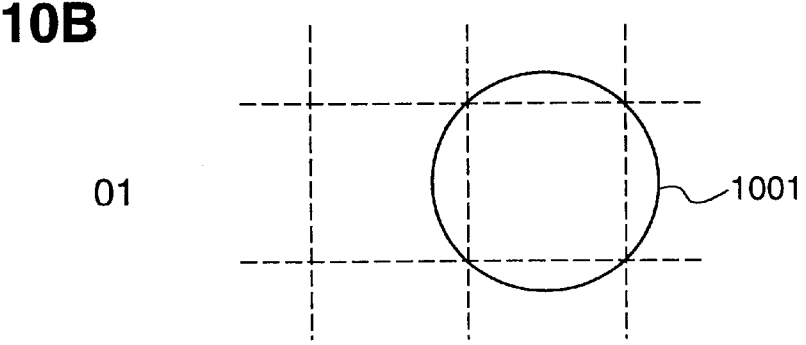
Figure 10C:
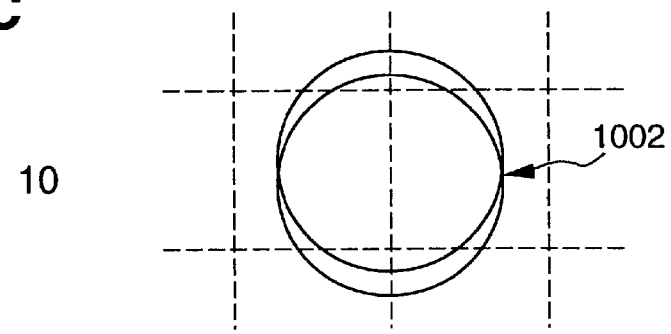
Figure 10D:
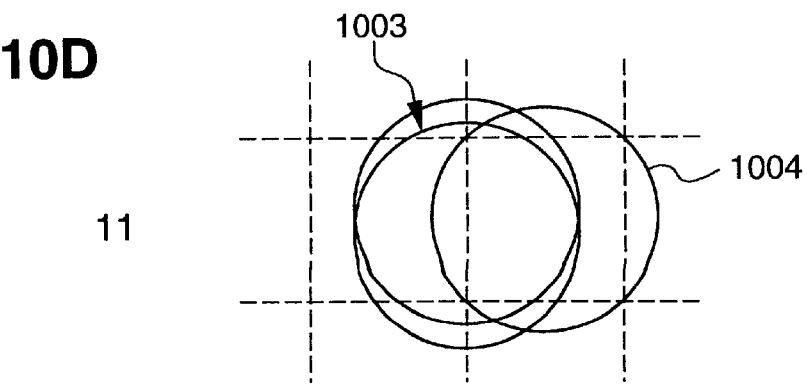

In pixel data (00 to 11) obtained by quaternary conversion of pixel data that can assume 256-valued pixel data (density value) ranging from "0" to "255" by error diffusion, if one pixel data is "0" (00), no dot is printed at the pixel position (FIG. 10A);

if one pixel data is "1" (01), a duplicated dot 1001 is printed only once at a position corresponding to a resolution of 360 dpi (FIG. 10B);

if one pixel data is "2" (10), a duplicated dot 1002 is printed in two scans at a position (on the dotted line indicating the frames in FIG. 10C) corresponding to a resolution of 720 dpi; and if one pixel data is "3" (11), a duplicated dot 1003 is printed in two scans at a position corresponding to a resolution of 720 dpi, and a dot 1004 is printed at a position corresponding to a resolution of 360 dpi in the third scan (triple printing) (FIG. 10D).

FIG. 9 shows the relationship between the optical reflection density and dot density of dots formed by magenta ink with normal concentration (dye concentration=2.5%) and ink diluted three times the normal ink (dye concentration= 0.833%) when the above-mentioned printing is made.

In FIG. 9, the dotted line represents the relationship between the dot density and optical reflection density of dots formed by the ink with normal concentration, and the solid line represents the relationship of dots formed by the ink diluted three times. Note that dot density (%) of "100" is obtained by single printing, "200" is obtained by double printing, and "300" is obtained by triple printing.

The flow of image information in this embodiment will be described below.

In this embodiment, assume that one pixel of image data in the image processing apparatus (host computer) 601 on the host side with respect to the print elements of the printhead is expressed by 8 bits (256 values).

In the image processing apparatus 601 on the host side, pixel data of the individual color components of image data are converted into quaternary data by error diffusion. Each quaternary data is expressed by 2 bits. More specifically, quaternary pixel data can assume "00", "01", "10", and "11" in binary notation in the order from the lower density levels. The quaternary pixel data are transmitted to the color ink-jet printer apparatus 602 of this embodiment via the interface 614 in units of scan lines (to be referred to as rasters hereinafter) of an image.

Figure 11:
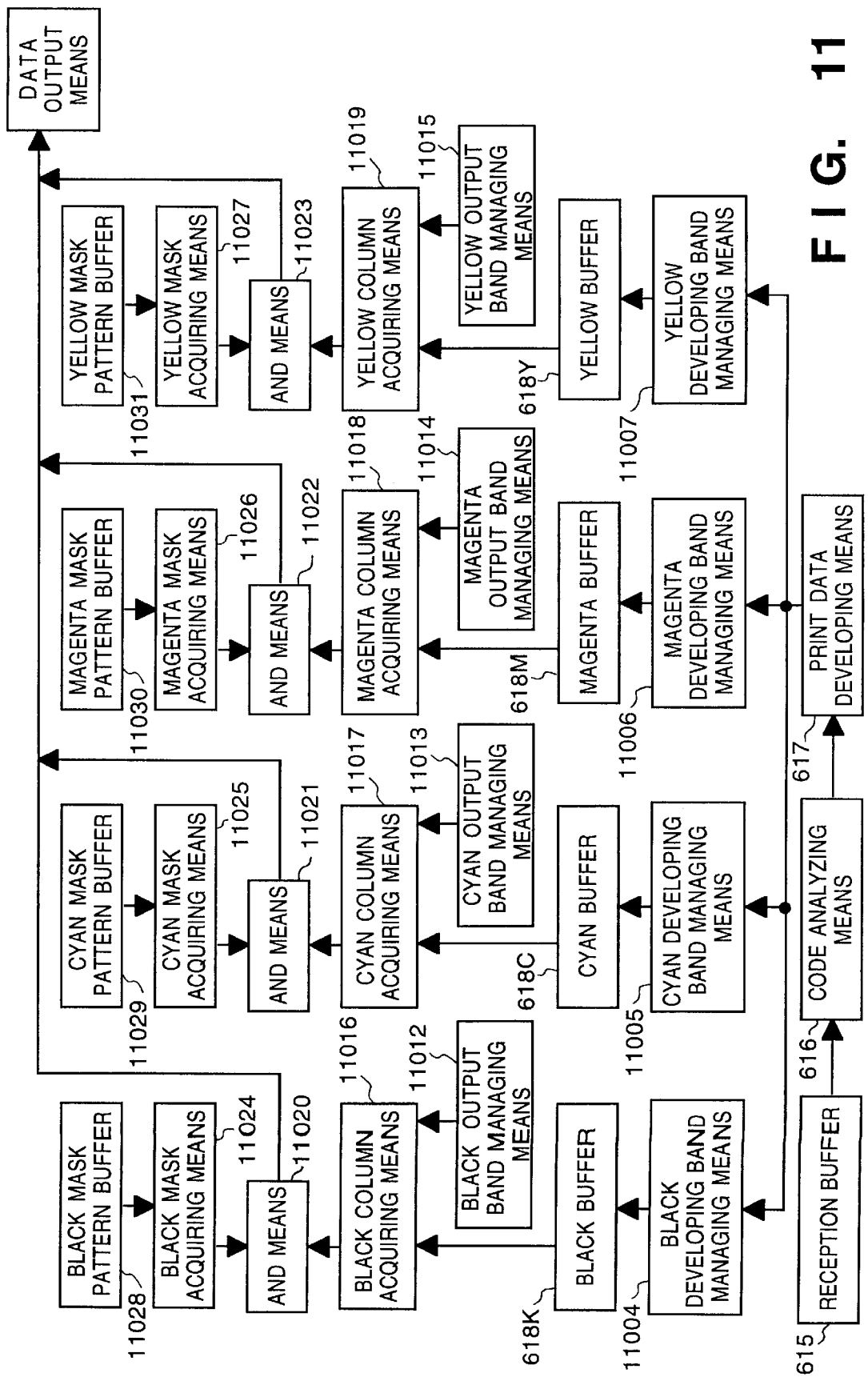
FIG. 11 is a block diagram for explaining the mask processing of print data in the first embodiment.

FIG. 11 is a block diagram showing the arrangement of management of print buffers and masks in the color ink-jet printer apparatus 602 of this embodiment. The same reference numerals in FIG. 11 denote the same parts as in FIG. 6 above, and a detailed description thereof will be omitted.

Print data developed by the print data developing means 617 are developed on print buffers 618Y, 618M, 618C, and 618K of the corresponding colors in units of bands by developing band managing means 11004, 11005, 11006, and 11007 of the corresponding colors. Reference numerals 11012, 11013, 11014, and 11015 denote output band managing means for managing to read out print data corresponding to the band position to be actually printed in units of colors from those stored in the print buffers of the corresponding colors and to output them to the printheads; and 11016, 11017, 11018, and 11019, column acquiring means for acquiring the column data to be printed from the print buffers of the corresponding colors in accordance with instructions from the output band managing means of the corresponding colors. Reference numerals 11028 to 11031 denote mask pattern buffers that store pattern data for masking data in correspondence with the colors; 11024 to 11027, mask acquiring means for reading out the mask patterns to be actually used from the corresponding mask pattern buffers; and 11020 to 11023, AND means for logically ANDing the column data and mask patterns of the corresponding colors. The masked image data of the individual colors are output to the printheads that eject inks of the corresponding colors, via a data output means 11032.

The color ink-jet printer apparatus 602 receives print codes transmitted from the host computer 601 and stores them in the reception buffer 615. The stored print codes are analyzed by the code analyzing means 616 as print data expressed by 2 bits per color. The analyzed print data of the individual colors are developed by the print data developing means 617 and the developed data are stored in the print buffers 618Y, 618M, 618C, and 618K of the corresponding colors under the control of the developing band managing means 11004 to 11007.

Each of these print buffers 618Y, 618M, 618C, and 618K is configured in units of storage areas for eight rasters. Also, these print buffers 618Y, 618M, 618C, and 618K store print data for eight rasters (to be referred to as a column hereinafter) at identical print positions in the main scanning direction as 1-byte data. Note that each pixel data of print data is expressed by 2 bits. The two bits of each pixel data are managed in units of bits, and when data are read out from the print buffers in units of columns (bits) and are printed, pixels are printed at a resolution of 360 dpi. Note that data for eight rasters will be referred to as one band hereinafter.

In this embodiment, the black print buffer 618K stores print data for four bands, i.e., bands K1 to K4, the cyan print buffer 618C stores print data for eight bands, i.e, bands C1 to C8, and the magenta print buffer 618M stores print data for 12 bands, i.e., bands M1 to M12. The yellow print buffer 618Y stores print data for 16 bands, i.e., bands Y1 to Y16. The storage control of these print data are made by the developing band managing means 11004 to 11007.

The reason why the print buffers of the individual colors have different data configurations is that the data amounts of rasters to be held until data to be printed at identical raster positions on a printing medium supplied to the print elements of the corresponding colors and printed differ since image data are transmitted from the host computer 601 in units of quaternary-converted rasters (see FIG. 7).

The print data of the individual colors developed by the print data developing means 617 are transferred to and stored in the print buffers 618K, 618C, 618M, and 618Y of the corresponding colors by the developing band managing means 11004 to 11007 of the corresponding colors. The first bands to be developed on the print buffers of the print data of the individual colors are assumed to be bands K1, C1, M1, and Y1. If k−1, c−1, m−1, and y−1 represent the previous developing positions corresponding to the individual colors, the current developing positions of band data correspond to the positions obtained by incrementing the previous positions by +1, i.e., Kk, Cc, Mm, and Yy. As a result of incrementing (+1), if k=5 is obtained, k=1 is set; if c=9 is obtained, c is reset to 1; if m=13 is obtained, m is reset to 1; and if y=17 is obtained, y is reset to 1. In this manner, the developing position of black print data changes in the order of K1, K2, K3, K4, K1, K2, K3, K4, K1, K2, K3, K4, . . . , the developing position of cyan print data changes in the order of C1, C2, C3, C4, C5, C6, C7, C8, C1, C2, C3, C4, . . . , the developing position of magenta print data changes in the order of M1, M2, M3, M4, . . . , M10, M11, M12, M1, M2, M3, M4, . . . , and the developing position of yellow print data changes in the order of Y1, Y2, Y3, Y4, . . . , Y14, Y15, Y16, Y1, Y2, Y3, Y4, . . .

Subsequently, printing is performed using the print data developed on the print buffers 618K, 618C, 618M, and 618Y of the individual colors. Note that this embodiment adopts 3-pass printing that prints each pixel by scanning the printhead three times. The printing method in this case will be explained below.

In this embodiment, each print data is thinned out by a mask pattern stored in the mask pattern buffer of the corresponding color, and the thinned-out data is printed. Each of the mask pattern buffers 11028 to 11031 is divided into regions in units of eight elements (nozzles) obtained by dividing 24 print elements (nozzles) into three groups to store mask patterns, and each mask pattern is used for masking print data. The three-divided mask patterns will be referred to as masks A, B, and C hereinafter.

FIGS. 12A to 12C show the formats of the mask pattern buffers used in this embodiment, and the mask pattern is made up of masks A to C.

Each of mask patterns A, B, and C consists of 1,024 bytes, and one byte of each mask pattern is used in correspondence with one column (8 bits) of the print data for eight rasters stored in each print buffer. Since this embodiment processes data expressed by 2 bits per pixel, the number of columns for storing the mask pattern must assume an even value.

Figure 13:
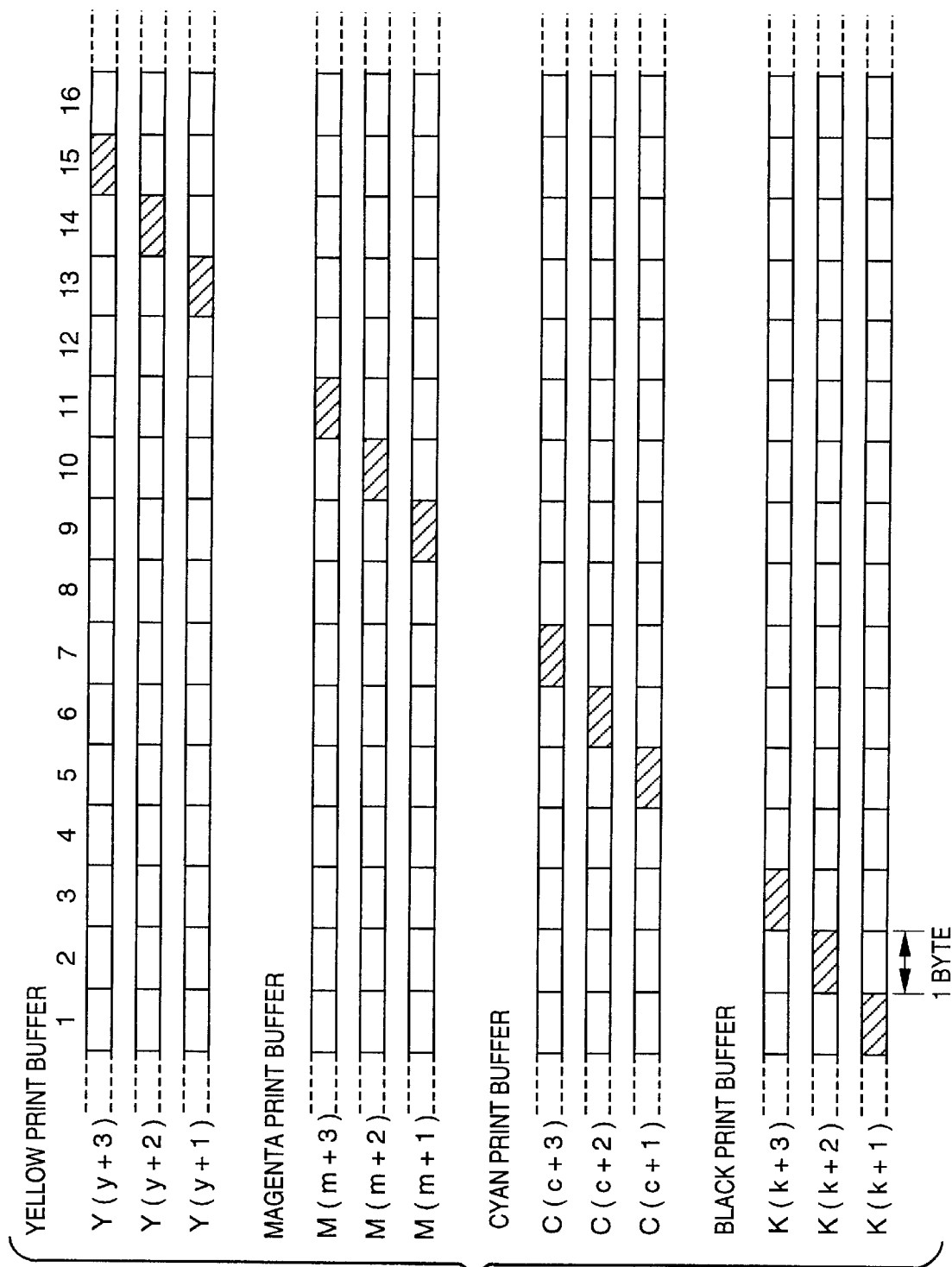
FIG. 13 illustrates the look-up method of print buffers upon printing in the first embodiment.

As has been described above with reference to FIG. 7, since the positional relationship between the print elements of the printhead and the printing medium has a slope of one column with respect to eight rasters, the positions of print data read out from the print buffers during one driving period of the printhead are shifted by one byte between adjacent bands of an identical color, and are shifted by two bytes (two columns) between adjacent color print data, as indicated by hatched portions in FIG. 13.

As shown in FIG. 13, when the developing positions of print data of the individual colors are Kk, Cc, Mm, and Yy, the following head driving data of the corresponding colors are acquired, from the paper feed side, from the corresponding bands. That is, in black print data, the first, second, and third bytes are respectively acquired from bands K(k+1), K(k+2), and K(k+3). In cyan print data, the fifth, sixth, and seventh bytes are respectively acquired from bands C(c+1), C(c+2), and C(c+3). In magenta print data, the ninth, 10th, and 11th bytes are respectively acquired from bands M(m+1), M(m+2), and M(m+3). Furthermore, in yellow print data, the 13th, 14th, and 15th bytes are respectively acquired from bands Y(y+1), Y(y+2), and Y(y+3).

Also, the look-up positions of the mask patterns of the individual colors are shifted by one byte between adjacent bands, as indicated by hatched portions in FIGS. 12A to 12C. The look-up positions of the mask patterns are managed by the mask acquiring means 11024, 11025, 11026, and 11027 shown in FIG. 11, so that when the look-up position reaches the final column (1024), the first column 1 is looked up next.

Each of the AND means 11020, 11021, 11022, and 11023 logically ANDs print data for the first eight nozzles (one band), in the paper feed direction of the printing medium, of the 24 print elements (nozzles) of the corresponding color of the printhead, and mask pattern A for one band, and the ANDed result is output from the data output means 11032. Each of the AND means 11020 to 11023 logically ANDs print data for the next eight nozzles (one band) and mask B, and outputs the ANDed result. Furthermore, each of the AND means 11020 to 11023 logically ANDs print data for the last eight nozzles (one band) and mask C, and outputs the ANDed result.

Figure 14:
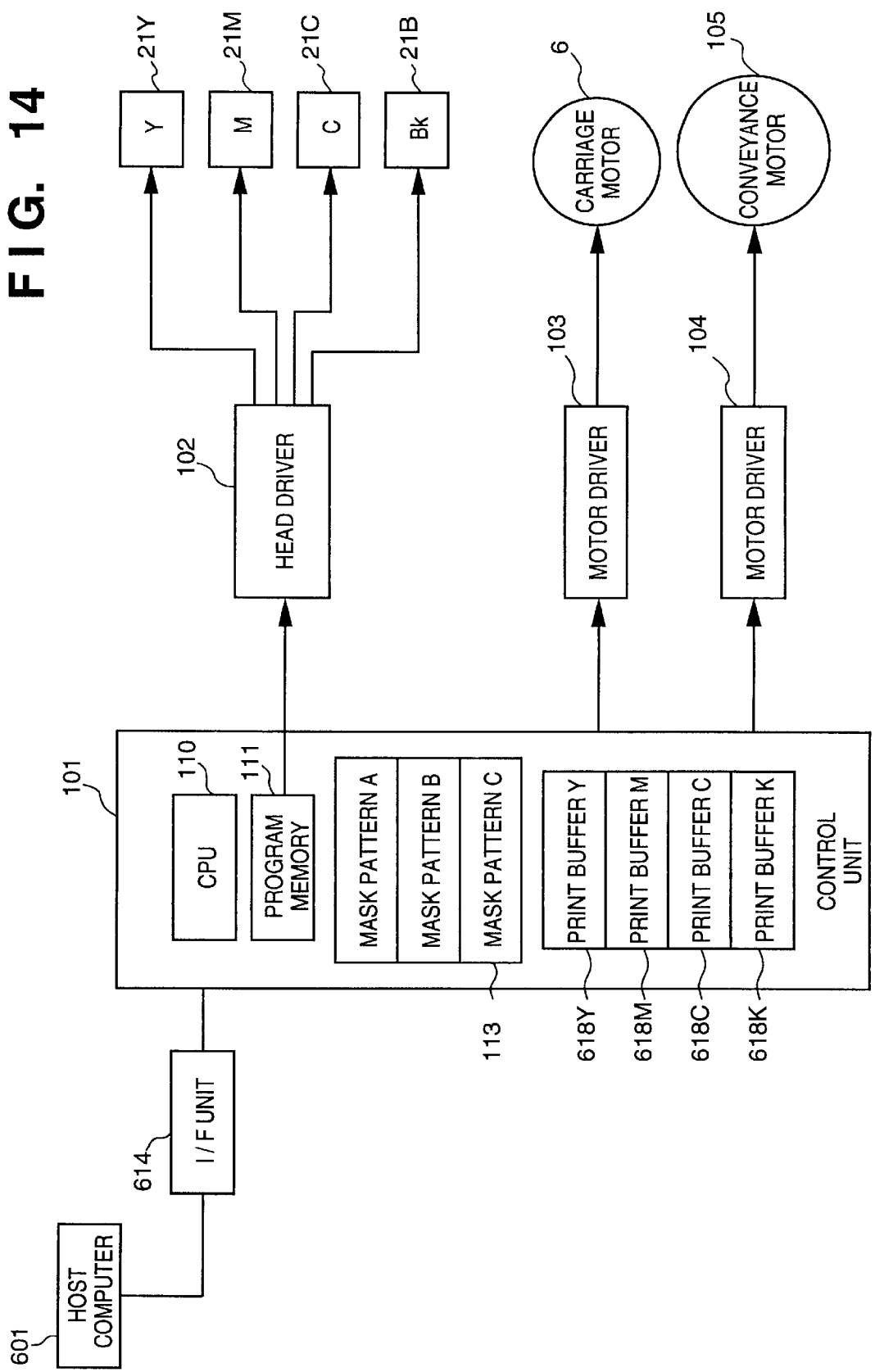
FIG. 14 is a block diagram showing the arrangement of a printer apparatus in the first embodiment.

FIG. 14 is a block diagram showing the arrangement of the color ink-jet printer apparatus of this embodiment. The same reference numerals in FIG. 14 denote the same parts as in the above drawings, and a detailed description thereof will be omitted.

The control unit 101 controls the operation of the overall color ink-jet printer apparatus of this embodiment, and comprises a CPU 110 such as a microprocessor, a program memory 111 that stores the control program to be executed by the CPU 110, a mask pattern memory 113 (corresponding to the mask pattern buffers 11028 to 11031 in units of colors shown in FIG. 11) that stores mask patterns, a RAM having the print buffers 618 and the like for storing print data of the corresponding colors, and the like. The mask patterns include mask patterns A to C in units of colors, as described above. Mask pattern A is used for masking data (8 bits) for the eight print elements, on the upstream side in the feed direction of the printing medium, of the 24 print elements of the printhead of each color, mask pattern B is used for masking the next eight bits, and mask pattern C is used for masking 8 bits on the most downstream side. The print buffers 618 store print data for different bands in units of colors, as described above.

Reference numeral 102 denotes a head driver for driving printheads 21Y to 21K of the corresponding colors in accordance with print data and control signals output from the control unit 101 to execute printing. Reference numerals 103 and 104 denote motor drivers for respectively driving the carriage motor 6 and a paper feed motor 106 in accordance with control signals from the control unit 101.

Figure 15:
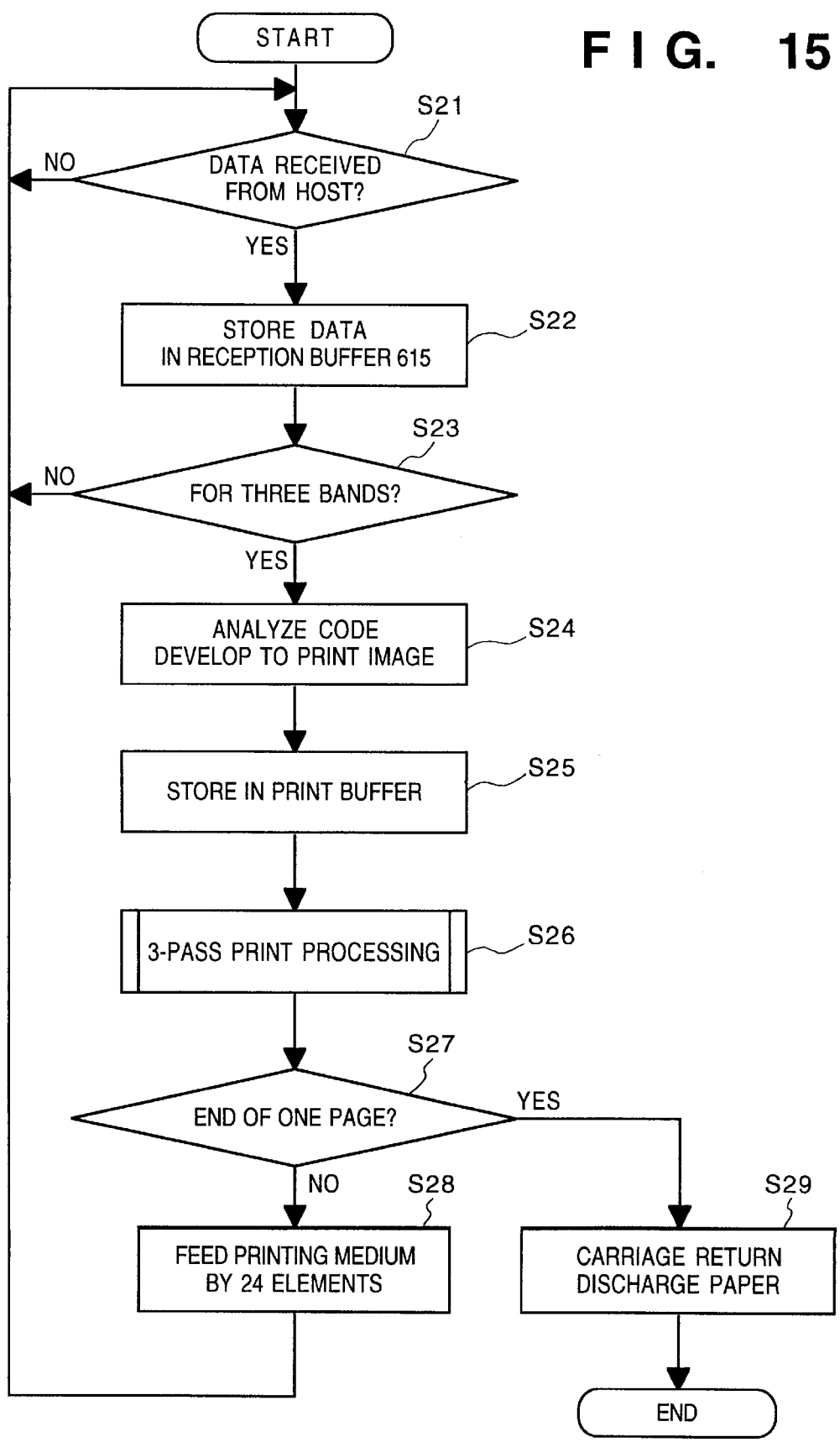
FIG. 15 is a flow chart showing the print processing in the printer apparatus in the first embodiment.

FIG. 15 is a flow chart showing the data reception processing from the host computer 601 and the printing processing executed in the color ink-jet printer of this embodiment, and the control program that executes this processing is stored in the program memory 111.

In step S21, it is checked if print codes are received from the host computer 601 via the interface 614. If YES in step S21, the flow advances to step S22 and the received print codes are stored in the reception buffer 615. The flow then advances to step S23 to check if a predetermined amount of print codes of each color, e.g., an amount for three bands (corresponding to the width to be printed by the scans of each printhead 21), is stored in the reception buffer 615. If NO in step S23, the flow returns to step S21 to execute the abovementioned processing; otherwise, the flow advances to step S24 to analyze the print codes stored in the reception buffer 615 and to develop them to print images. The flow advances to step S25, and the developed print data are stored in the print buffers 618 in units of colors.

Figure 16:
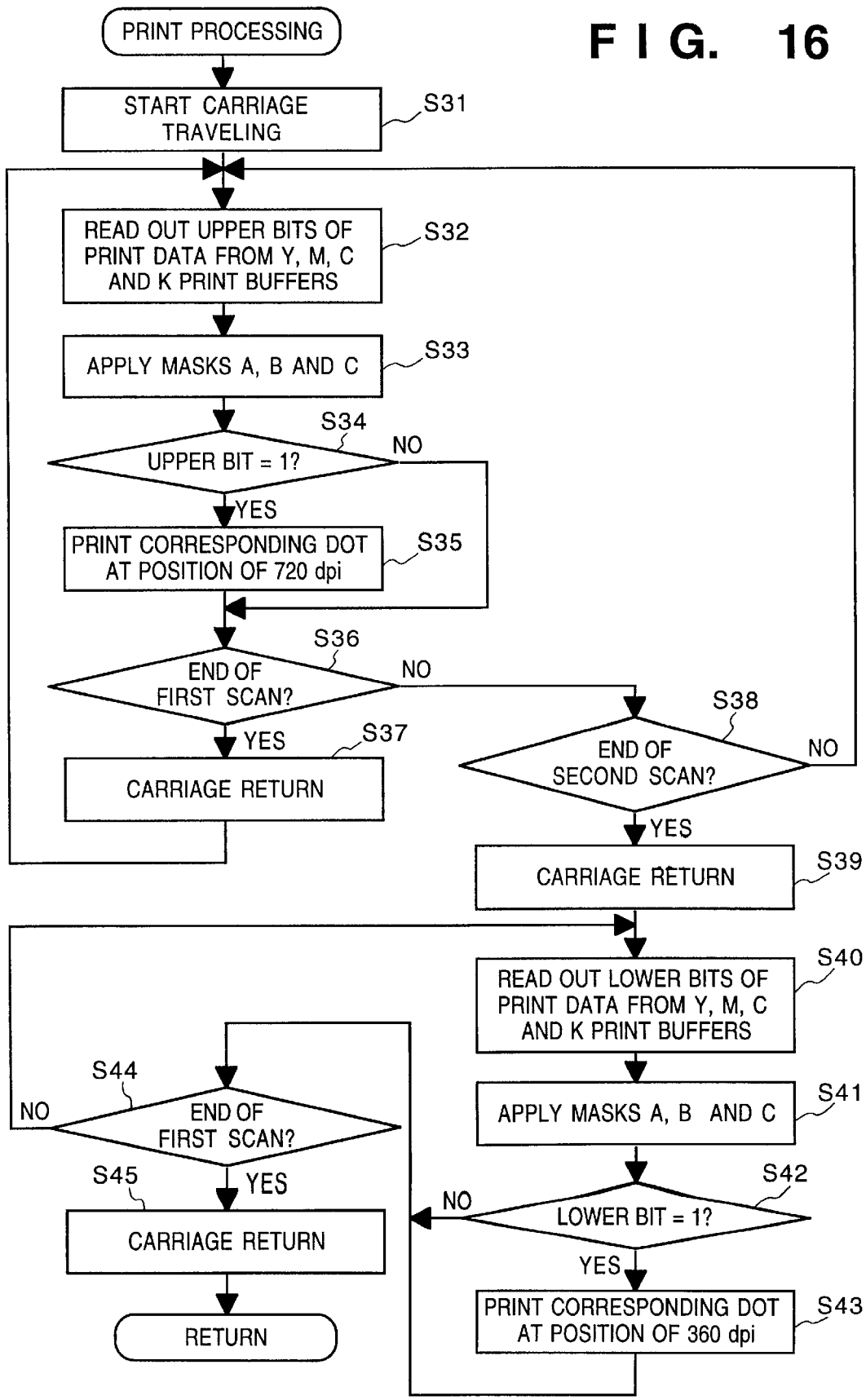
FIG. 16 is a flow chart showing the print processing in the printer apparatus in the first embodiment.

The flow then advances to step S26, and print data for three bands are printed by 3-pass printing shown in the flow chart in FIG. 16. This processing will be described in detail later with reference to the flow chart in FIG. 16. Upon completion of 3-pass printing, the flow advances to step S27 to check if printing for one page is complete. If NO in step S27, the flow advances to step S28, and the paper feed motor 105 is driven to feed a printing medium (e.g., a print paper sheet) by a length corresponding to the width printed by the 24 print elements of each printhead 21. Thereafter, the flow returns to step S21. On the other hand, if it is determined in step S27 that printing for one page is complete, the flow advances to step S29, and the carriage motor 6 is driven to return the carriage unit 2 to the home position. Also, the paper feed motor 105 is driven to discharge the printed printing medium outside the apparatus.

FIG. 16 is a flow chart showing the print processing executed in step S26 in FIG. 15 above, and a case will be exemplified wherein data for 24 print elements of each color are printed by three passes. For the sake of simplicity, in this flow chart, when the upper bit is "1", the dot is printed in the first and second passes; when the lower bit is "1", the dot is printed in the third pass. However, the present invention is not limited to such specific method, and dots may be printed in any pass as long as the driving period of the print elements of each printhead 21 does not exceed a predetermined value.

In step S31, the carriage unit 2 begins to travel. The flow advances to step S32 to read out the upper bits (24 bits in units of colors) of data (2-bit data) corresponding to the pixels to be printed in the next scan from the Y, M, C, and K (black) print buffers 618Y to 618K. The positions of data of the corresponding colors read out from the print buffers at that time are as has been described above with reference to FIG. 13. The flow then advances to step S33 to mask print data corresponding to eight print elements located on the upstream side, in the feed direction of the printing medium, of each color printhead, of the readout print data using mask A, to mask the next eight bits using mask B, and to mask the last eight bits using mask C (corresponding to logical ANDing by the AND means 11020 to 11023 in FIG. 11).

The flow advances to step S34 to check if the masked bit (upper bit) is "1". Then, the print elements corresponding to print data "1" are driven by the head driver 102 to print dots at positions corresponding to a resolution of 720 dpi, as has been described above with reference to FIG. 10. In step S36, it is checked if the first scan is complete. If NO in step S36, the flow advances to step S38 to check if the second scan is complete. If NO in step S38, the flow returns to step S32 to execute the above-mentioned processing. If it is determined in step S36 that printing in the first scan is complete, the flow advances to step S37 to return the carriage unit 2 to the home position. Thereafter, the flow returns to step S32 to repeat the above-mentioned processing.

If it is determined in step S38 that printing in two passes is complete, the flow advances to step S39 to return the carriage unit 2. Thereafter, the flow advances to step S40h to, in turn, read out the lower bits of print data (2-bit data) of the corresponding colors from the Y, M, C, and K (black) print buffers 618Y to 618K. As in step S33 above, the print data are masked using masks A, B, and C. In step S42, dots are printed on pixels corresponding to the masked bits (lower bits)="1" at positions corresponding to a resolution of 360 dpi. The flow then advances to step S44 to check if printing by one scan of the carriage unit 2 is complete. If NO in step S44, the flow returns to step S40 to execute the above-mentioned processing. On the other hand, if YES in step S44, since 3-pass printing has been finished, the flow advances to step S45 to return the carriage unit 2 to the home position, thus ending the processing.

Figure 1:
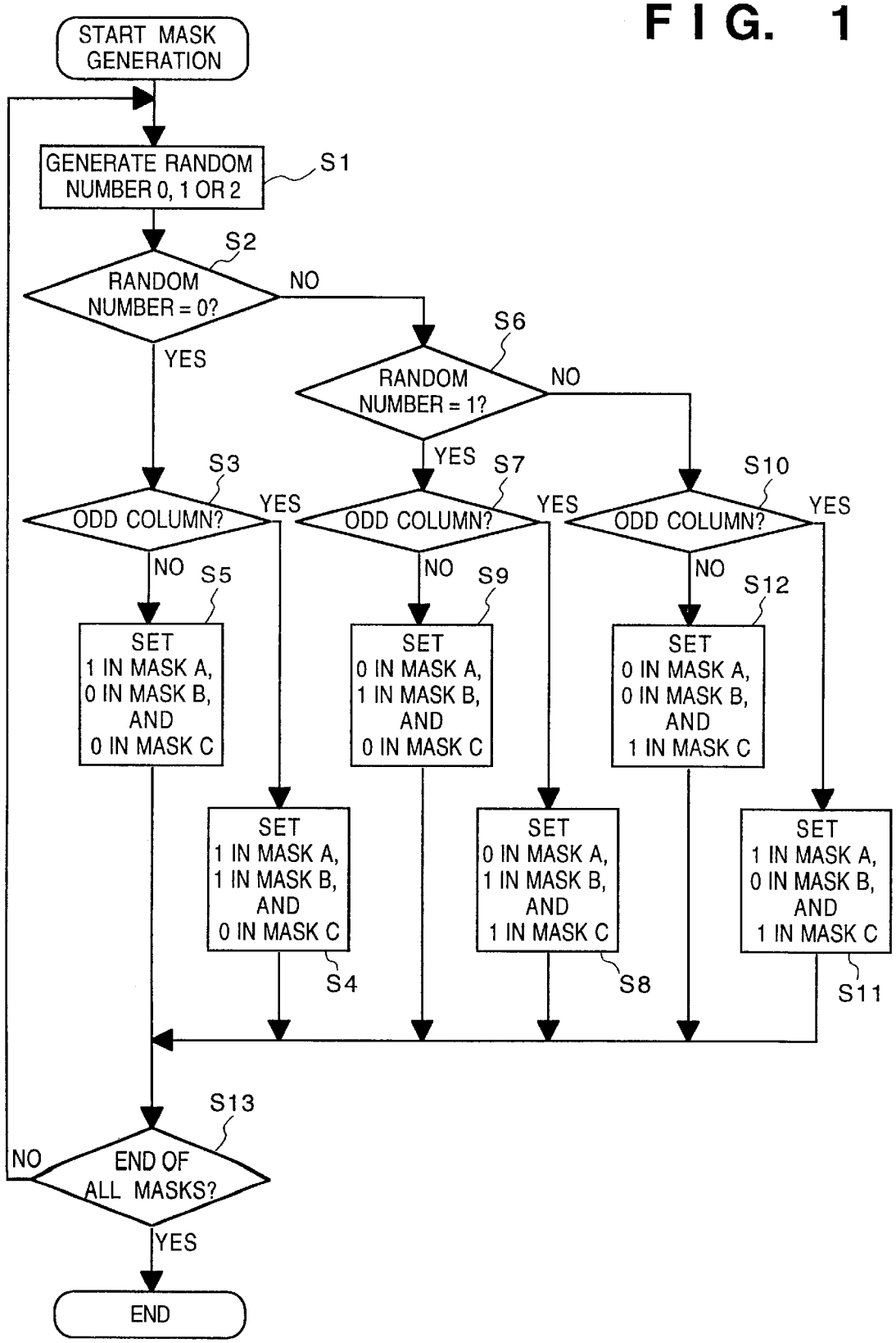
FIG. 1 is a flow chart showing the generation processing of a mark pattern in the first embodiment of the present invention.

The method of generating mask patterns A, B, and C will be explained below with reference to the flow chart in FIG. 1. Note that the generation processing of mask patterns may be executed inside the color ink-jet printer apparatus 602 of this embodiment or may be executed by the host computer 601 to download the generated data to the printer apparatus 602, or mask patterns generated in advance by this method may be stored in the ROM or the like of the printer apparatus 602 and may be used in printing.

In step S1, a random number generation means generates a three-value random number "0", "1", or "2". The random number generation means may use random numbers pre-stored in a ROM or the like. This processing sequentially determines mask patterns A, B, and C from their first bits.

In step S2, it is checked if the random number generated by the random number generation means is "0". If YES in step S2, the flow advances to step S3 to check if the mask patterns to be generated are those for the upper bit of the above-mentioned 2-bit print data, i.e., those for an odd column in FIGS. 12A to 12C. If YES in step S3, the flow advances to step S4 to set "1" in the corresponding bits in mask patterns A and B and to set "0" in the corresponding bit in mask pattern C. On the other hand, if it is determined in step S3 that the mask patterns to be generated are those for the lower bit of the 2-bit print data, i.e., those for an even column in FIGS. 12A to 12C, the flow advances to step S5 to set "1" in the corresponding bit in mask pattern A, and to set "0" in the corresponding bits in mask patterns B and C.

If it is determined in step S2 that the generated random number is not "0", the flow advances to step S6 to check if the generated random number is "1". If YES in step S6, the flow advances to step S7 to check, as in step S3, if the mask patterns to be generated are those for an odd column. If YES in step S7, the flow advances to step S8 to set "1" in the corresponding bits in mask patterns B and C and to set "0" in the corresponding bit in mask pattern A. If NO in step S7, the flow advances to step S9 to set "1" in the corresponding bit in mask pattern B and to set "0" in the corresponding bits in mask patterns A and C.

If it is determined in step S6 that the generated random number is not "1", since the random number is "2", the flow advances to step S10 to check, as in step S3 or S7, if the mask patterns to be generated are those for an odd column. If YES in step S10, the flow advances to step S11 to set "1" in the corresponding bits in mask patterns C and A and to set "0" in the corresponding bit in mask pattern B. On the other hand, if NO in step S10, the flow advances to step S12 to set "1" in the corresponding bit in mask pattern C and to set "0" in the corresponding bits in mask patterns A and B.

Upon completion of processing in one of steps S4, S5, S8, S9, S11, and S12, the flow advances to step S13 to shift the bit positions to be set in mask patterns A, B, and C by one bit to the right in FIGS. 12A to 12C, thus executing the above-mentioned mask setting processing. In this manner, the above-mentioned processing is repetitively executed until all the mask patterns A to C are generated.

The generated mask patterns are stored in the mask pattern memory 113 (the mask pattern buffers 11028 to 11031) in FIG. 14, and print data are masked using these stored mask patterns, thus executing the above-mentioned print operation.

In the first embodiment, 2-bit print data is used to express four gradation levels. For example, each print data may be defined by 3 bits. In this case, 4-pass printing may be performed by printing four dots if the most significant bit is "1", two dots if the next bit is "1", and one dot if the least significant bit is "1". In this case as well, mask patterns A to C can be generated by changing their generation probabilities for each of the 3 bits. More specifically, mask patterns with all ON bits are formed in correspondence with the most significant bit, mask patterns with two ON bits are formed in correspondence with the next bit, and mask patterns with one ON bit are formed in correspondence with the least significant bit.

In this manner, print data expressed by 2 bits per pixel is printed by at least two passes, and the generation probability of in mask pattern "1" for two columns is set to be "$2/3$" for the first column data and "$1/3$" for the second column data. That is, in general, n-bit data is printed by at least $2^{(n-1)}$ passes to obtain $2^n$ gradation levels.

[Second Embodiment]

In the second embodiment, print data is expressed by 4 bits per pixel, and the 4-bit pixel data is decoded to 4×2, eight dot data. Mask data in the second embodiment is applied to the decoded dot data.

FIGS. 17A to 17M illustrate examples of pixels printed based on 4-bit print codes in the second embodiment.

In each printed pixel, the odd numbered dots (indicated by cross-hatching) from the left side are formed by overstriking a plurality of ink droplets, and the even numbered dots (indicated by hatching) are printed by single ink ejection.

Figure 17A:
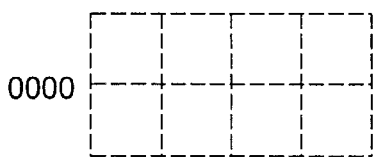
FIGS 17A to 17M illustrate the relationship between the 4-bit codes and printed dots by the print method according to the second embodiment of the present invention.
Figure 17B:
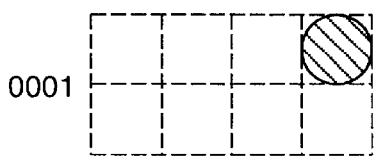
Figure 17C:
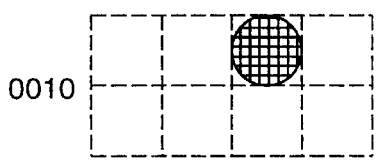
Figure 17D:
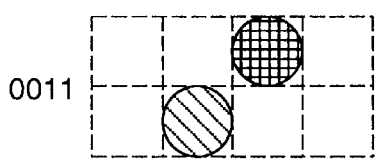
Figure 17E:
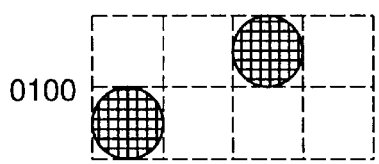
Figure 17F:
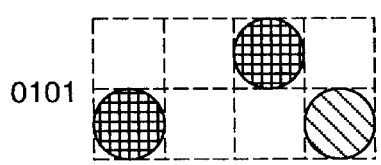
Figure 17G:
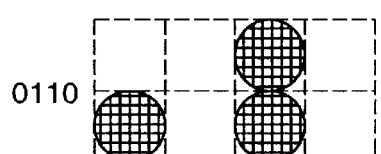
Figure 17H:
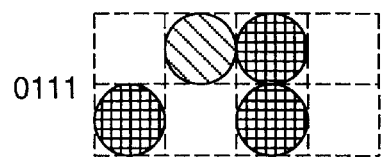
Figure 17I:
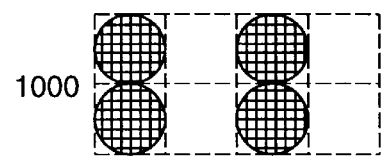
Figure 17J:
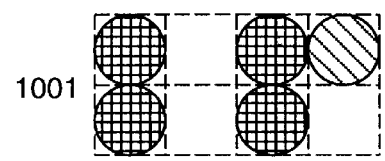
Figure 17K:
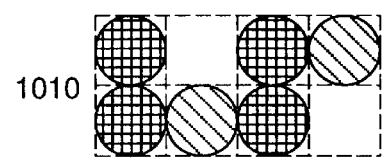
Figure 17L:
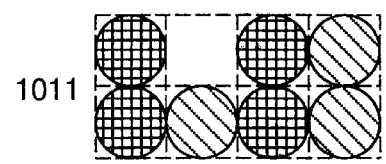
Figure 17M:
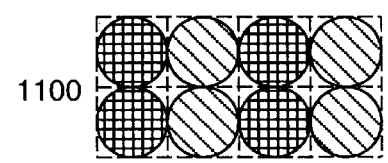
Figure 18:
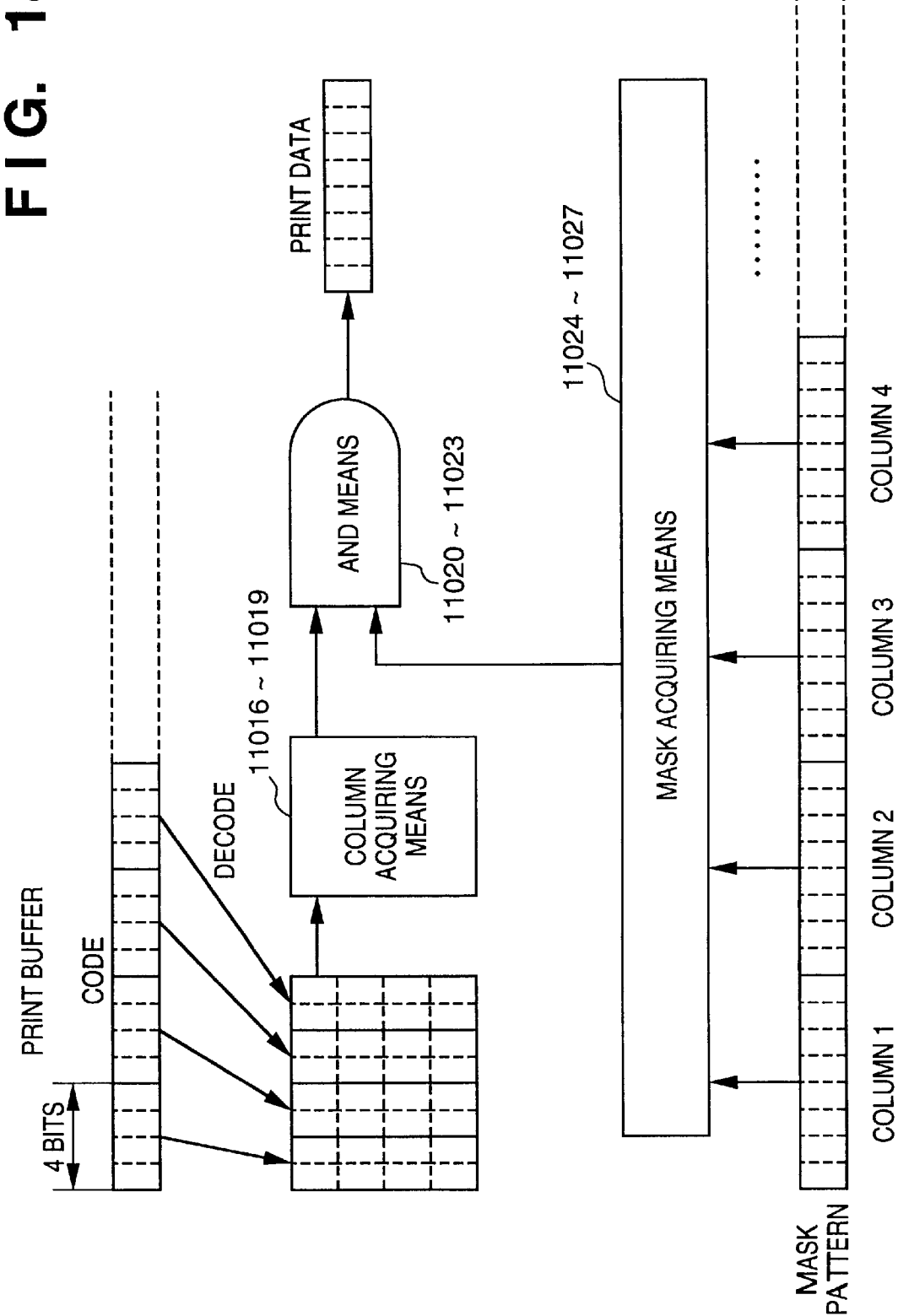
FIG. 18 is a diagram showing the method of generating print data in the second embodiment.

As shown in FIG. 18, in the second embodiment, print codes of the individual colors are stored in the corresponding print buffers, and 4-bit print codes read out from the print buffers are decoded to 4×2 dot pattern data, as described above with reference to FIGS. 17A to 17M. The decoded dot data are selected by column acquiring means of the corresponding colors on the basis of print timings corresponding to the carriage positions, and are output to corresponding AND means. On the other hand, mask patterns of the corresponding colors stored in the mask pattern buffers are also selected and read out by mask acquiring means of the corresponding colors, and are output to the corresponding AND means. In this manner, the color data masked by the AND means are output as print data. Note that the column acquiring means, AND means, and mask acquiring means in FIG. 18 correspond to the column acquiring means 11016 to 11019, AND means 11020 to 11023, and mask acquiring means 11024 to 11027 in FIG. 11 above.

In this manner, by the above-mentioned pattern, printing based on print data is performed as follows. That is, when data is "0000", no dot is printed (FIG. 17A). When data is "0001", one pixel is printed by forming one dot by one ink droplet (FIG. 17B); when "0010", one dot formed by overstriking two ink droplets (FIG. 17C); when "0011", two dots formed by three ink droplets (FIG. 17D); when "0100", two dots formed by four ink droplets (FIG. 17E); when "0101", three dots formed by five ink droplets (FIG. 17F); when "0110", three dots formed by six ink droplets (FIG. 17G); when "0111", four dots formed by seven ink droplets (FIG. 17H); when "1000", four dots formed by eight ink droplets (FIG. 17I); when "1001", five dots formed by nine ink droplets (FIG. 17J); when "1010", six dots formed by 10 ink droplets (FIG. 17K); when "1011", seven dots formed by 11 ink droplets (FIG. 17L); and when "1100", eight dots formed by 12 ink droplets (FIG. 17M).

With this processing, when printing is performed only once for each pixel in masked data, nine gradation levels are expressed by a maximum of eight dots, while in the second embodiment, a maximum of 13 gradation levels can be expressed.

[Another Embodiment]

When binary expression is to be attained by 1-bit print data, mask processing is performed using general mask patterns A, B, and C. In the flow chart shown in FIG. 1, when a random number generated by the random number generation means is "0", "1" is set in the corresponding bit in mask pattern A, and "0" is set in the corresponding bits in mask patterns B and C. When the random number is "1", "1" is set in the corresponding bit of mask pattern B, and "0" is set in the corresponding bits in mask patterns A and C. Furthermore, when the random number is "2", "1" is set in the corresponding bit in mask pattern C, and "0" is set in the corresponding bits of mask patterns A and B. More specifically, the mask pattern generation processing for even columns in the above embodiment is performed for all the mask patterns. With this processing, the number of times of ink ejection per pixel is one, and binary expression can be realized.

As described above, when binary image data (1 bit) and quaternary image data (2 bits) are to be printed, the method of generating mask patterns is switched to cope with these two types of image data, according to the print method of this embodiment.

In this embodiment, before the host computer transfers image data to the printer apparatus, a code indicating the format of the image data to be transferred is transferred. The host computer or printer apparatus generates mask patterns corresponding to the code indicating the format of the image data. Subsequently, using these mask patterns, image data developed on the print buffers are thinned out, and the thinned-out data are printed. In this manner, a printer apparatus which prints by performing processing corresponding to codes of different image formats can be realized.

Figure 19:
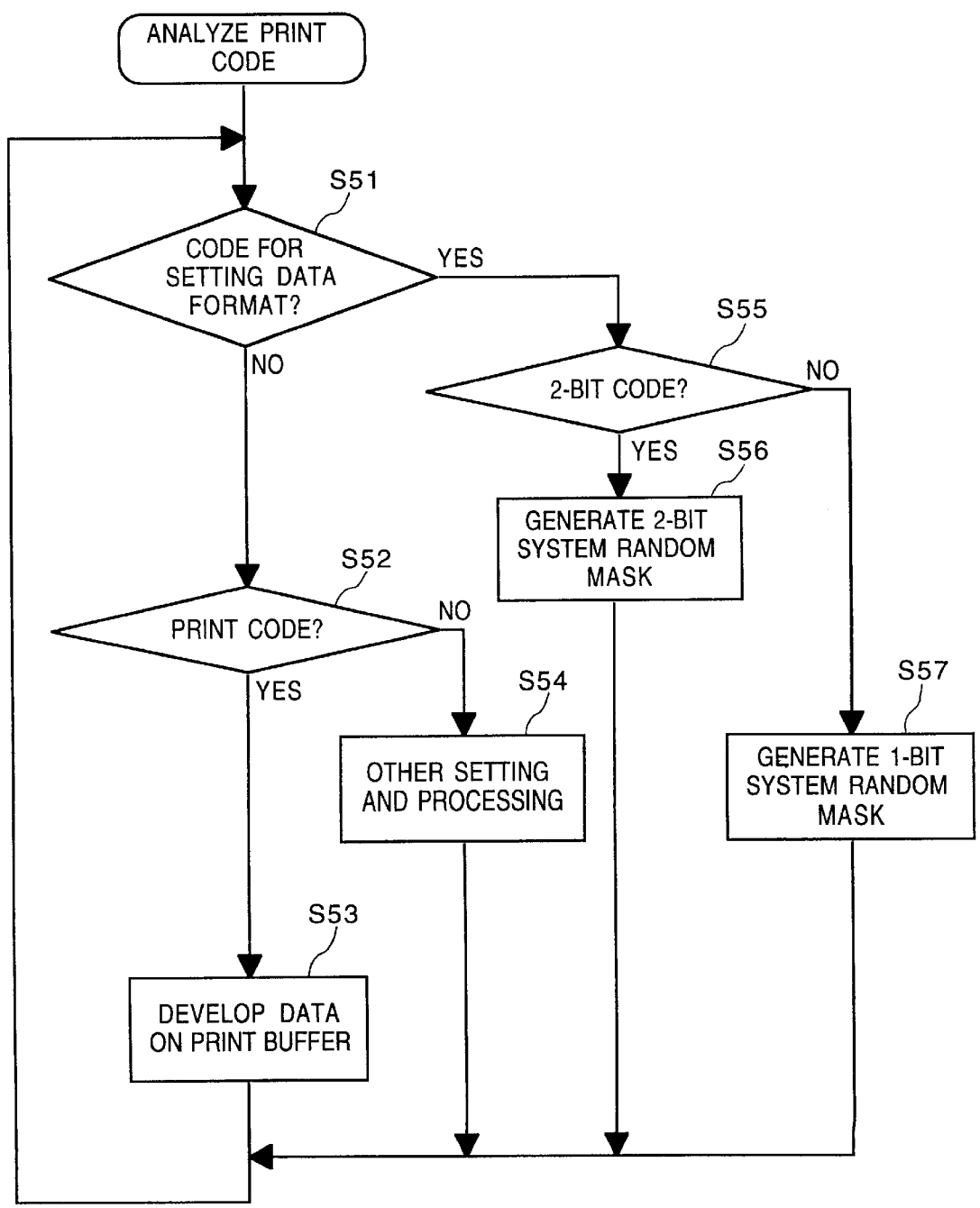
FIG. 19 is a flow chart showing the code reception processing in a printer apparatus according to the second embodiment.

FIG. 19 is a flow chart showing the code reception processing from the host computer in the printer apparatus of the second embodiment.

Upon reception of a code, the flow advances to step S51 to check if the code is a code for setting the data format. If NO in step S51, the flow advances to step S52 to check if the code is a print code indicating the image to be printed. If YES in step S52, the flow advances to step S53, and the print code is developed to an image, which is stored in the print buffer. On the other hand, if NO in step S52, the flow advances to step S54 to execute processing corresponding to the code.

If it is determined in step S51 that the code is a code for setting the data format, the flow advances to step S55 to check if the code to be set is a 2- or 1-bit code. If the code to be set is a 2-bit code, the flow advances to step S56 to generate mask patterns corresponding to the 2-bit code in accordance with the flow chart in FIG. 1, and the generated mask patterns are stored in the mask memory 113. On the other hand, if the code to be set is a 1-bit code, the flow advances to step S57 to generate mask patterns corresponding to the 1-bit code, and the generated mask patterns are stored in the mask memory 113.

Such mask patterns may be changed in correspondence with inks contained in the printheads. The method of discriminating the type of ink tank or head cartridge attached will be described below.

FIGS. 20A and 20B are views for explaining the method of detecting the type of ink tank of the head cartridge 1 used in this embodiment.

When the ink tanks 15 and 16 are attached to the head cartridge 1 and a hook 70 engages with projections 73 of the tanks, the ink tanks are fixed on the cartridge 1. Contact portions 71 used for detecting the type of attached ink tank are arranged in a direction in which the force of the hook 70 acts. The tank detection contact portions 71 are provided to the head cartridge 1 and the ink tanks 15 and 16. Reference numeral 72, shown in FIG. 20B, denotes an enlarged view of each contact portion 71, which includes three electrode pads 1, 2, and 3. Although not shown, the same number of electrode pads as those on the tanks are similarly arranged on the head cartridge 1, and are electrically connected to those on the tanks at the contact portions 71. Note that electrode pads 1 and 2 of the contact portion 71 of the ink tank 15 or 16 are electrically connectable but electrode pad 3 is electrically isolated. For example, an ink tank in such state is assumed to contain normal ink. The ink-jet printer apparatus of this embodiment energizes these electrode pads via the contact portion 71 of the cartridge 1 side, which is in contact with the electrode pads of the ink tank, thereby detecting the type of ink contained in the attached ink tank.

More specifically, in an example shown in FIG. 20B, a current flows between electrode pads 1 and 2, but does not flow between electrode pads 1 and 3 and between electrode pads 2 and 3. This state is stored in advance in, e.g., the ROM of the ink-jet printer apparatus main body as a state indicating the normal ink tank is attached. In contrast to this, when, for example, electrode pad 3 of an ink tank that contains low-density ink is set in an electrically connectable state, it can be determined that ink contained in this ink tank is different from that in the normal ink tank.

In this embodiment, the number of electrode pads used for identifying the type of ink in an ink tank is three. When the number of electrode pads is increased, a larger number of different types of inks contained in ink tanks can be identified.

Furthermore, whether or not the head cartridge 1 is exchanged can be detected by checking the energization state via the contact portion 19 shown in FIG. 3A.

In the above embodiments, the driver of the host computer discriminates the type of head cartridge attached upon printing, and automatically sets the print mode in correspondence with the discriminated type of the head cartridge, thus controlling the color processing in the driver and processing in a controller in association with each other.

In contrast to this, in this embodiment, the user can arbitrarily set the print mode on the display screen of the host computer so as to reliably select the print mode according to his or her purpose.

Figure 21:
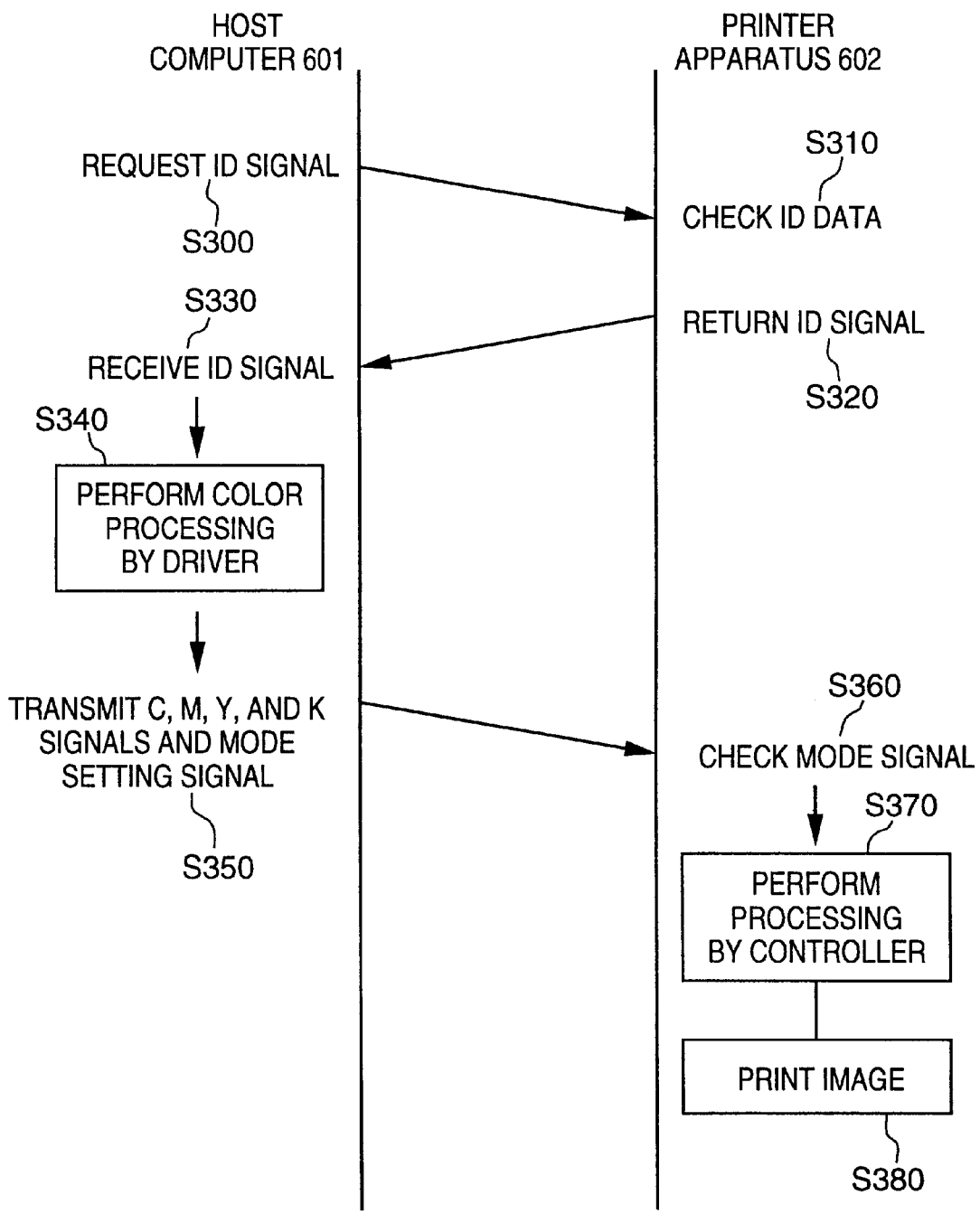
FIG. 21 is a chart showing data exchange between a host computer and the printer apparatus in still another embodiment of the present invention.

The operation of FIG. 21 will be briefly described below. The host computer 601 inquires of the printer apparatus 602 as to the type of attached cartridge (S300). In response to this inquiry, the printer apparatus 602 reads the ID of the attached cartridge, and discriminates the type of cartridge 1 attached (S310). Then, the printer apparatus 602 sends back the ID signal to the host computer 601 (S320). Upon reception of the ID signal (S330), the host computer 601 performs color processing for image data using the driver in correspondence with the type of the cartridge (S340), and transmits generated color signals (C, M, Y, and K signals) and a mode signal to the printer apparatus 602 (S350). Upon reception of these signals, the printer apparatus 602 performs image development and the like by a controller (S370) and prints an image (S380).

Since the arrangement of the host computer 601 and the printer apparatus 602 in this embodiment is the same as that in the above embodiment, a detailed description thereof will be omitted.

When the host computer 601 and the printer apparatus 602 are connected via a one-way communication, the host computer 601 sets a print mode using a predetermined head cartridge or the like, and instructs the printer apparatus 602 to execute print processing corresponding to the set mode. If the condition of the set print mode matches the type of printhead attached at that time or the print mode in the printer apparatus, the print processing is executed; otherwise, the printer apparatus sends back, e.g., an error signal. In response to this signal, the user of the host computer checks the type of printhead, and the like attached to the printer apparatus 102 and sets the mode again.

Figure 22:
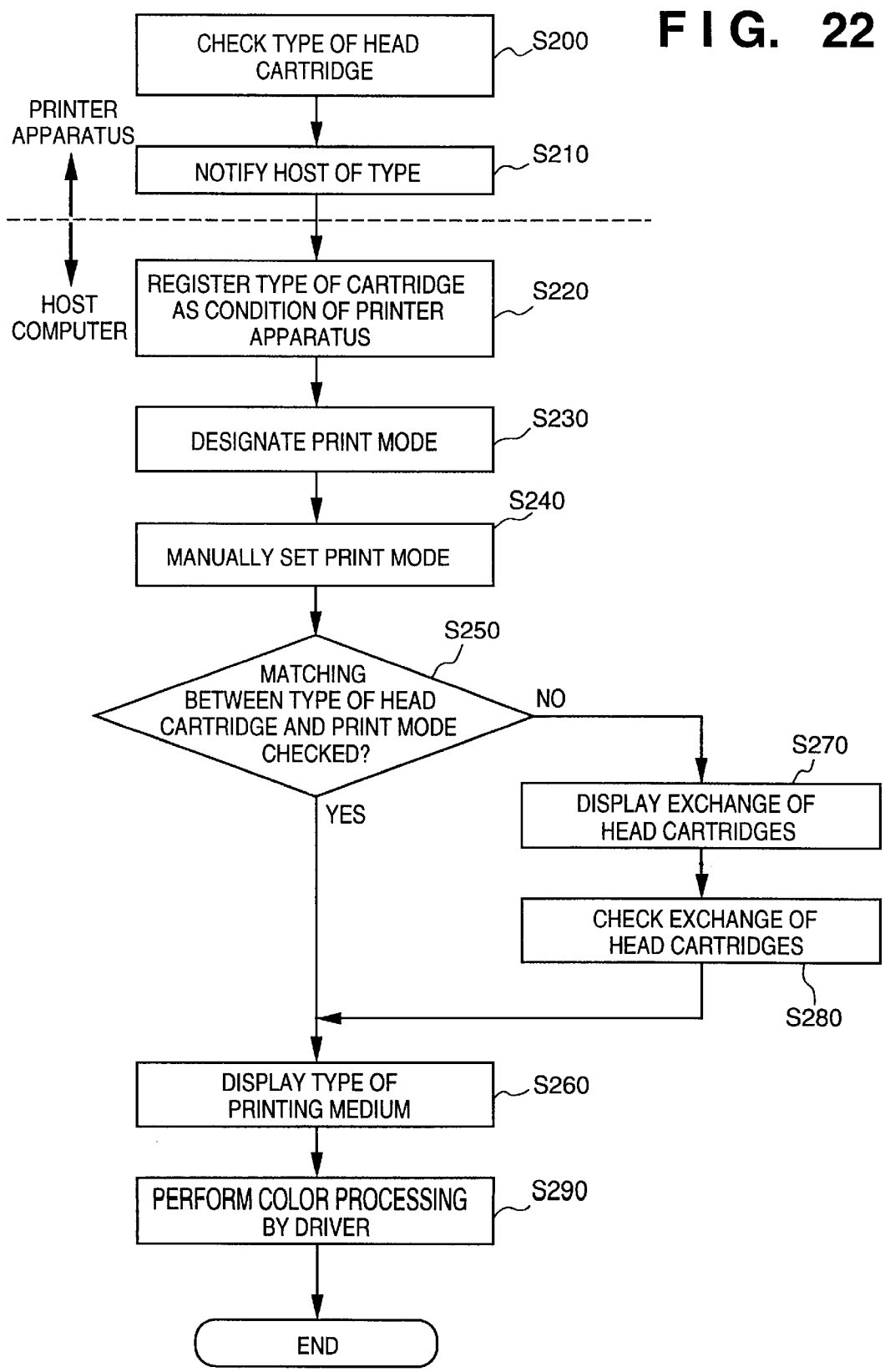
FIG. 22 is a flow chart showing the print mode setting processing in still another embodiment of the present invention.

FIG. 22 is a flow chart showing the print mode setting processing in this embodiment.

When the power switch of the printer apparatus 602 is turned on and the head cartridge 1 is attached, the type of head cartridge is checked based on the ID of the head cartridge as in the above embodiment (S200). An ID signal indicating the checking result in step S200 is supplied to the host computer (S210). These steps S200 and S210 are processing operations on the printer apparatus 602 side. The subsequent processing is executed by the host computer 601.

Based on the ID signal received from the printer apparatus 602, the type of head cartridge 1 currently attached to the printer apparatus 602 is registered as the state of the printer apparatus 602 together with the type of printer apparatus 602 (S220). The user then selects the print mode (S230). In this case, the user manually sets the print mode corresponding to his or her purpose using the input unit 106 on the basis of a user interface (UI), as shown in, e.g., FIG. 23, displayed on the display screen of the host computer 601 (S240).

In this embodiment, the relationship between the print modes and IDs is: a normal mode=ID1, pictorial mode 1=ID2, pictorial mode 2=ID3, and black & white mode= ID0. In this manner, the individual head cartridges 1 respectively correspond to the print modes. Accordingly, whether or not the head cartridge 1 corresponding to the set print mode is attached is discriminated by checking the type of head cartridge registered in step S220 (S250).

If the head cartridge 1 corresponding to the set print mode is attached, a message indicating that a printing medium corresponding to the print mode is set is displayed for the user. That is, the normal mode can cope with any of normal paper, coating paper, and pictorial paper. Therefore, when the normal mode is set, a message shown in, e.g., FIG. 24 is displayed for the user.

On the other hand, if the head cartridge corresponding to the set print mode is not attached, an instruction urging the user to attach another head cartridge corresponding to the print mode is given (S270). For example, if the current head cartridge is for the normal mode (ID=1) but pictorial mode 1 is set as the print mode, a message shown in FIG. 25 is displayed to prompt the user to exchange the head cartridge for an appropriate type (the head cartridge of ID=2). It is confirmed by repeating steps S200, S210, S220, and S250 above if the type of head cartridge 1 is exchanged to one corresponding to the print mode (S280). After the head cartridge 1 and printing medium corresponding to the print mode are set in this manner, the host computer 601 starts color processing of the driver (S290).

As described above, according to this embodiment, image formation can be reliably performed in the print mode matching the user's purpose, and print errors caused by setting errors of the print mode can be prevented.

When the normal mode or black & white mode is set, since the type of printing medium is not limited, the processing in step S260 may be skipped. With this processing, since the number of times of warning display can be reduced, the more user friendly UI (user interface) can be provided.

FIG. 26 shows head cartridges with different ink types, and the printer apparatus main body.

These head cartridges 1 are assigned IDs that can be recognized by the printer apparatus. The dye concentrations of inks in a head cartridge with ID="1" are: 2.5% (yellow), 3.0% (magenta), 2.7% (cyan), and 2.6% (black). The dye concentrations of inks in a head cartridge with ID="2" are: 2.5% (yellow), 1.0% (magenta), 0.9% (cyan), and 1.3% (black). On the other hand, the dye concentrations of inks in a head cartridge with ID="3" are: 2.5% (yellow), 0.8% (magenta), 0.7% (cyan), and 0.9% (black). That is, in this embodiment, inks having different color property (including black) are used.

Note that the color property in this embodiment represent, in principle, the degree of strength of color development of ink itself or the strength of color development in the state wherein the ink is printed on a printing medium, and represent the degree of brightness in the case of achromatic color. In this sense, when identical dyes or pigments are used, the color property may represent the dye density of ink. When such characteristics are compared while inks are printed on the printing medium, the characteristics may represent the optical reflection density or comparison of maximum saturations with nearly equal hues. That is, color property presenting high color development are determined to be excellent. The ink is not limited to a liquid ink but may be a solid ink.

In this embodiment, when the ink cartridge with ID=1 is attached, one pixel can be satisfactorily expressed by setting binary yellow, magenta, cyan, and black gradation data. On the other hand, when the ink cartridge with ID=2 is attached, one pixel can be satisfactorily expressed by setting binary yellow and quaternary magenta, cyan gradation data and black data. Furthermore, when the ink cartridge with ID=3 is attached, one pixel can be satisfactorily expressed by setting binary yellow data, quinary magenta and cyan gradation data, and ternary black gradation data.

More specifically, in the ink cartridge with ID=1, one pixel data is expressed by 1-bit yellow, magenta, cyan, and black data. In the ink cartridge with ID=2, one pixel data is expressed by 1-bit yellow data and 2-bit cyan, magenta, and black data. Furthermore, in the ink cartridge with ID=3, one pixel data is expressed by 1-bit yellow data, 3-bit magenta and cyan data, and 2-bit black data.

In this printer apparatus, the configurations of the print buffers are made different in correspondence with the ID of the head cartridge attached. When the head cartridge with ID=1 is attached, the print buffers of all the colors have the 1-bit configuration. When the head cartridge with ID=2 is attached, the print buffer for yellow data has the 1-bit configuration, and the print buffers for other colors have the 2-bit configuration. Furthermore, when the head cartridge with ID=3 is attached, the print buffer for yellow data has the 1-bit configuration, the print buffers for magenta and cyan data have the 3-bit configuration, and the print buffer for black data has the 2-bit configuration.

As described above, when the user selects a head cartridge in correspondence with an image and the type of printing medium, the number of gradation levels of the image to be printed can be changed. In this case as well, by suppressing the gradation of yellow data with high lightness, an increase in capacity of the print buffer can be suppressed.

The present invention can provide excellent effects especially in a printhead and printer apparatus that use heat energy among ink-jet print systems.

As the representative arrangement and principle of such ink-jet printing system, one practiced by use of the basic principle disclosed in, for example, U.S. Pat. Nos. 4,723,129 and 4,740,796 is preferred. The above system is applicable to either one of so-called on-demand type and continuous type. Particularly, in the case of the on-demand type, the system is effective because, by applying at least one driving signal, which corresponds to printing information and gives a rapid temperature rise exceeding nucleus boiling, to each of electrothermal transducers arranged in correspondence with a sheet or liquid channels holding liquid (ink), heat energy is generated by the electrothermal transducer to effect film boiling on the heat acting surface of the printhead, and consequently, a bubble can be formed in the liquid (ink) in one-to-one correspondence with the driving signal. By ejecting the liquid (ink) through an ejection opening by growth and shrinkage of the bubble, at least one ink droplet is formed. If the driving signal is applied as a pulse signal, the growth and shrinkage of the bubble can be attained instantly and adequately to achieve ejection of the liquid (ink) with particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of orifices, liquid channels, and electrothermal transducers (linear liquid channels or right-angled liquid channels) as disclosed in the above specifications, the arrangement using U.S. Pat. Nos. 4,558,333 and 4,459,600, which disclose an arrangement having a heat acting portion arranged in a bent region may be used. In addition, an arrangement based on Japanese Patent Laid-Open No. 59-123670 which discloses an arrangement using a slit common to a plurality of electrothermal transducers as an ejection portion of the electrothermal transducers, or Japanese Patent Laid-Open No. 59-138461 which discloses an arrangement having an opening for absorbing a pressure wave of heat energy in correspondence with an ejection portion, may be used.

It is preferable to add recovery means for the printhead, preliminary auxiliary means, and the like provided as an arrangement of the printer of the present invention since the print operation can be further stabilized. Examples of such means include, for the printhead, capping means, cleaning means, pressurization or suction means, and preliminary heating means using electrothermal transducers, another heating element, or a combination thereof. It is also effective to execute a preliminary ejection mode which performs ejection independently of printing.

Furthermore, as for the print mode of the printer apparatus, the present invention is effective for not only an apparatus having a print mode using only a primary color such as black or the like, but also an apparatus having at least one of a multi-color mode using a plurality of different colors or a full-color mode achieved by color mixing, although such modes may be attained either by using an integrated printhead or by combining a plurality of printheads.

Moreover, in each of the above-mentioned embodiments of the present invention, the liquid is described as ink. Alternatively, the present invention may employ ink which solidifies at room temperature or less and softens or liquefies at room temperature, or ink which liquefies upon application of a print signal, since it is a common practice to perform temperature control of the ink itself within the range from 30° C. to 70° C. in the ink-jet system, so that the ink viscosity can fall within the stable ejection range.

In addition, in order to prevent a temperature rise caused by heat energy by positively utilizing it as energy for a change in state of the ink from the solid state to the liquid state, or to prevent evaporation of the ink, ink which solidifies in a non-use state and liquefies by heating may be used. In any case, the present invention can be applied to a case wherein ink which liquefies by applied heat energy, such as ink which liquefies upon application of heat energy according to a print signal and is ejected in a liquid state, ink which begins to solidify when it reaches a printing medium, or the like, is used. In this case, the ink may oppose electrothermal transducers while being held in the liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer apparatus according to the present invention may be used as an image output terminal of an information processing equipment such as a computer, a copying machine combined with a reader, and the like, or a facsimile apparatus with the transmission/reception function.

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

As described above, according to this embodiment, printing based on image data that expresses four values by 2 bits can be attained.

According to this embodiment, multi-pass printing for image data that expresses two values by 1 bit can be coped with by changing the mask pattern generation method. For this reason, various types of multi-valued image data can be coped with without changing any hardware arrangement.

The capacity of the print buffer can be reduced as compared to the case wherein four values are expressed by 3 bits.

In this embodiment, an apparatus for ejecting ink onto a medium has been disclosed as one mode of a printer apparatus. However, an information processing apparatus of the present invention is not limited to such specific apparatus. For example, the present invention may be applied to other printer apparatuses, such as a thermal or sublimation color printer apparatus. That is, apparatuses that form images using dots are all included in the scope of the present invention.

In the above-mentioned embodiments, the ink-jet printer apparatus has been exemplified. However, the image processing method of the present invention is not limited to such specific printer apparatus. The present invention can be similarly applied to apparatuses that adopt other print methods. Also, the image processing method of the present invention can be applied not only to the ink-jet printer but also to general image processing.

In this embodiment, a significant bit has been described as a bit "1" but may be a bit "0".

The present invention is not limited to the above embodiments and various changes and modifications can be made within the spirit and scope of the present invention. Therefore, to apprise the public of the scope of the present invention, the following claims are made.

What is claimed is:

1. A printer apparatus for printing an image by scanning a printhead having a plurality of ejection portions that eject ink a plurality of number of times with respect to a substantially identical print area of a printing medium, comprising:

printing means for printing image data expressed by a plurality of (n) bits by performing at least n scans of the printhead;

conversion means for converting the image data for each scan of the printhead in correspondence with a position of a significant bit of the n bits of the image data; and control means for controlling said printing means on the basis of image data converted by said conversion means to print an image on the printing medium, wherein said printing means prints the image having tones by forming dots for one pixel on the printing medium with at least portions of the dots overlapping each other.

2. The apparatus according to claim 1, wherein said conversion means converts the image data on the basis of a mask pattern.

3. The apparatus according to claim 2, wherein the mask pattern has different patterns corresponding to each of the n bits of the image data.

4. The apparatus according to claim 1, wherein the printhead can be exchanged among a first ink-jet printhead for ejecting first ink with high color property, and a second ink-jet printhead for ejecting second ink with low color property.

5. A printer apparatus according to claim 1, further comprising an ink container having information indicating a color property of ink contained therein.

6. A printer apparatus according to claim 1 further comprising a head cartridge including a combination of an ink container and a printhead, said combination including information indicating color property of ink contained in the ink container.

7. A print method for printing an image by scanning a printhead having a plurality of ejection portions that eject ink a plurality of number of times with respect to a substantially identical print area of a printing medium, comprising the step of:

printing image data expressed by a plurality of (n) bits after the image data is converted in accordance with a position of a significant bit in the n bits of the image data upon printing the image data by performing at least n print scans of the printhead, wherein the printhead prints an image having tones by forming dots for one pixel on the printing medium, at least portions of the dots overlapping each other.

8. The method according to claim 7, wherein the image data is converted on the basis of a mask pattern.

9. The method according to claim 8, wherein the mask pattern has different patterns corresponding to each of the n bits of the image data.

10. A print method for printing an image by scanning a printhead having a plurality of ejection portions that eject ink a plurality of number of times with respect to a substantially identical print area of a printing medium, comprising the step of:

printing 2-bit image data by performing at least two print scans after the image data is converted so that a generation rate of a dot to be printed based on an upper bit of the 2-bit image data is nearly twice a generation rate of a dot to be printed based on a lower bit of the image data.

11. A printer apparatus for printing an image by scanning a printhead having a plurality of ejection portions that eject ink a plurality of number of times with respect to a substantially identical print area of a printing medium, comprising:

printing means for printing image data expressed by 2 bits by performing at least two scans of the printhead;

conversion means for converting the image data so that a generation rate of a dot to be printed based on an upper bit of the 2-bit image data is nearly twice a generation rate of a dot to be printed based on a lower bit of the image data; and control means for controlling said printing means on the basis of converted image data converted by said conversion means to print an image having gradations.

12. The apparatus according to claim 11, wherein said conversion means converts the image data using a mask pattern.

13. A printer apparatus for printing an image by activating printing means corresponding to a print agent to a substantially identical print area of a printing medium a plurality of number of times, comprising:

printing means for printing image data expressed by a plurality of (n) bits by performing at least n printing operations;

conversion means for converting the image data for each scan of the printhead in accordance with a position of a significant bit of the n bits of the image data; and control means for controlling said printing means on the basis of the image data converted by said conversion means to print an image on the printing medium, wherein said printing means prints the image having gradations by forming dots for one pixel on the printing medium, at least portions of the dots overlapping each other.

14. The apparatus according to claim 13, wherein said conversion means converts the image data on the basis of a mask pattern.

15. The apparatus according to claim 14, wherein the mask pattern has different patterns corresponding to each of the n bits of the image data.

16. A printer apparatus for printing an image by activating printing means corresponding to a print agent to a substantially identical print area of a printing medium a plurality of number of times, comprising:

printing means for printing image data expressed by 2 bits by performing at least two print scans of the printhead;

conversion means for converting the image data so that a generation rate of a dot to be printed based on an upper bit of the 2-bit image data is nearly twice a generation rate of a dot to be printed based on a lower bit of the image data; and control means for controlling said printing means on the basis of converted image data converted by said conversion means to print an image.

* * * * *

UNITED STATES PATENT AND TRADEMARK OFFICE
CERTIFICATE OF CORRECTION

PATENT NO. : 6,158,836
DATED : December 12, 2000
INVENTOR(S) : Iwasaki et al.

It is certified that error appears in the above-identified patent and that said Letters Patent is hereby corrected as shown below:

Item [56] References Cited,
FOREIGN PATENT DOCUMENTS, "7052390" should read -- 7-52390 --, and "7144419" should read -- 7-144419 --.

Column 3,
Line 7, "FIGS" should read -- FIGS. --.

Column 10,
Line 20, "abovementioned" should read -- above-mentioned --.

Column 11,
Line 13, "S40h" should read -- S40 --.

Column 12,
Line 35, "in" should be deleted.

Column 16,
Lines 33, and 35, "property" should read -- properties --.

Column 19,
Line 63, "claim 1" should read -- claim 1, --.

Signed and Sealed this

Eleventh Day of September, 2001

*Attest:*

NICHOLAS P. GODICI
*Attesting Officer*  *Acting Director of the United States Patent and Trademark Office*